United States Patent
Lee et al.

(10) Patent No.: US 8,200,252 B2
(45) Date of Patent: Jun. 12, 2012

(54) DEVICE AND METHOD FOR TRANSMITTING CONTROL CHANNEL WITH PRE-ALLOCATED RESOURCES

(75) Inventors: Ju-Ho Lee, Suwon-si (KR); Xiaogiang Li, Beijing (CN); Yingyang Li, Beijing (CN); Yujian Zhang, Beijing (CN)

(73) Assignees: Samsung Electronics Co., Ltd. (KR); Beijing Samsung Telecom R&D Center (CN)

( * ) Notice: Subject to any disclaimer, the term of this patent is extended or adjusted under 35 U.S.C. 154(b) by 1157 days.

(21) Appl. No.: 12/029,681

(22) Filed: Feb. 12, 2008

(65) Prior Publication Data
US 2008/0212506 A1  Sep. 4, 2008

(30) Foreign Application Priority Data

Feb. 16, 2007  (CN) .......................... 2007 1 0079299

(51) Int. Cl.
*H04Q 7/20* (2006.01)
(52) U.S. Cl. ........ 455/458; 370/310; 370/312; 370/329; 370/287; 455/453; 455/452.2
(58) Field of Classification Search .................. 455/458, 455/452.2, 453; 370/329, 310, 312
See application file for complete search history.

(56) References Cited

U.S. PATENT DOCUMENTS

| | | | |
|---|---|---|---|
| 6,138,025 A * | 10/2000 | Lee et al. ....................... | 455/453 |
| 2006/0256839 A1 | 11/2006 | Tsai et al. | |
| 2007/0036067 A1 | 2/2007 | Zhang et al. | |
| 2007/0265016 A1 * | 11/2007 | Kahtava et al. ............. | 455/452.2 |
| 2008/0080423 A1 * | 4/2008 | Kolding et al. ............... | 370/329 |
| 2008/0212506 A1 * | 9/2008 | Lee et al. ....................... | 370/310 |
| 2009/0016254 A1 * | 1/2009 | Lee et al. ....................... | 370/312 |
| 2009/0274086 A1 * | 11/2009 | Petrovic et al. ............... | 370/312 |
| 2010/0158256 A1 * | 6/2010 | Sawahashi et al. ........... | 380/287 |

FOREIGN PATENT DOCUMENTS
KR  1020070121567  12/2007

* cited by examiner

*Primary Examiner* — Charles Shedrick
(74) *Attorney, Agent, or Firm* — The Farrell Law Firm, P.C.

(57) ABSTRACT

The method for an eNodeB transmitting control channels with pre-allocated resources comprising steps of the eNodeB determining whether to transmit the control channels according to its needs; the eNodeB transmitting the control channels with pre-allocated resources according to properties of the signaling to be transmitted. With the method proposed in present invention, operations in a receiving end are simplified so that the time spent in receiving signaling is shortened and power consumption is well reduced.

14 Claims, 20 Drawing Sheets

FIG.6

| UL Bit (1801) | DL bit (relative) (1802) |

DEVICE AND METHOD FOR TRANSMITTING CONTROL CHANNEL WITH PRE-ALLOCATED RESOURCES

BACKGROUND OF THE INVENTION

1. Field of the Invention

The present invention relates to a wireless communication system, especially to a device and method for transmitting control channel with pre-allocated resources in the wireless communication system.

2. Description of the Related Art

At present, the 3$^{rd}$ Generation Mobile Communication System Partnership Project (referred to as 3GPP) standardization organization has commenced on Long-term Evolution (referred to as LTE) to an existing system criteria. Among numerous physical layer transmission techniques, both a downlink transmission technique based on OFDM (Orthogonal Frequency Division Multiplexing) and an uplink transmission technique based on SCFDMA (Single Carrier Frequency Division Multiple Addressing) are the main premises for present standardization. In nature, OFDM is a multi-carrier modulation communication technique. Its basic principle is to divide a high rate data stream into multiple low rate data streams to be transmitted via a group of orthogonal sub-carriers simultaneously.

Due to the nature of multi-carrier, the technique of OFDM bears some technical advantages in reducing the complexity of an equalizer in a receiver and reducing an ISI (inter-symbol interference) through the introduction of CP (cyclic prefix) and so on. SCFDMA is essentially a single carrier transmission technique. With it, a PAPR (Peak to Average Power Ratio) is comparatively lower in a transmitter. Therefore, a power amplifier of a mobile terminal can be operated effectively to enlarge the cell coverage. In addition, good performance of comparatively lower processing complexity is held in the receiver.

Main principle concepts on LTE are illustrated in FIG. 1, FIG. 2 and FIG. 3.

According to existing discussions on LTE, the frame structure of the downlink in an LTE system is illustrated in FIG. 1. In an LTE system, the radio physical resource refers to time and frequency resources that a system or a user can occupy. It can be described with the radio frame (101-103), which bears the same time length as that in a WCDMA (Wide Band Code Division Multiple Access) system, i.e., 10 ms. Each frame is divided into several slots (104,105,. . . ,107). At present, it is supposed that each radio frame includes twenty slots of 0.5 ms. Each sub-frame includes multiple OFDM symbols. There are two types of time lengths of OFDM symbol's CP, i.e., the shorter CP's time length is about 4.8 μs and the longer CP's time length is about 16.7 μs. The longer CP slot is used for multi-cell broadcast/multicast and in the case that the cell is very large and the shorter CP slot is used for Unicast and in the case that the cell is very small. The shorter CP slot (108-114) includes seven OFDM symbols, and the longer CP slot (115-120) includes six OFDM symbols. According to present discussion, the TTI (transmission time interval) is specified as 1 ms, i.e., the time length of two slots (2×0.5 ms).

According to present assumptions for LTE research, FIG. 2 illustrates an uplink frame structure in an LTE system. Similar to the downlink frame structure, the time length of a radio frame (201, 202, 203) is the same as that in a WCDMA system, i.e., 10 ms. Each frame is divided into several slots (204, 205, 206, . . . , 207). Each radio frame includes twenty slots of 0.5 ms and each slot includes seven SCFDMA symbols (208-214). According to present discussion, transmission time interval (TTI) is 1 ms, which equals the time length of two slots.

FIG. 3 illustrates a processing process of SCFDMA signal. After some certain processing, a sending end gets modulation symbols (301) needed to be transmitted. The symbol is transformed to frequency domain through a DFT module (302), mapped to a sub-carrier position allocated through a sub-carrier mapping module (303), and then transformed to time domain through an IFFT module (304). After that the CP (305) is added, and the following operations are carried out. In order to distinguish with IFFT operation (304) and DFT operation carried out in the reception end, the DFT operation of module (302) is called as Pre-DFT operation.

According to present discussion progress in LTE, the physical time frequency resources of fundamental data for data transmission is divided into several radio blocks (RB) with each containing M continuous sub-carriers in frequency domain and N continuous data symbols in time domain. In the downlink, the data symbols are OFDM symbols, while in the uplink, they are SCFDMA ones. That is to say, a fundamental data physical RB consists of M*N basic time frequency resources. According to present discussion on LTE, M is specified as 12 and N is specified as the number of OFDM symbols in one slot in the downlink or the number of SCFDMA symbols in one slot in the uplink.

At present, it is considered by LTE to specify the fundamental physical RB for the transmission of control information. The used specification is just similar to that in the fundamental data physical RB, except that M or N may have different values. In present invention, for the convenience of description, the discussion is focused on the fundamental control physical RB.

Now, a basic idea on the design of LTE control channel is described so as to explain how to explicitly or implicitly indicate the physical resource used by an ACK/NACK channel.

In present research of downlink L1/L2 (L1/L2: Layer 1/Layer 2) control channel in LTE, TDM (time division multiplex) is applied in both the downlink L1/L2 control channel and the downlink data channel. The control channel is transmitted through the first n (n≦3) OFDM symbols in each TTI. Here, the L1/L2 control channel includes: a) a downlink scheduling control channel for the allocation of downlink resource; b) an uplink scheduling control channel for the allocation of uplink resource; and c) an ACK/NACK channel for acknowledgement to uplink data. At least two types of transmission formats are applied to configure each specific control channel, i.e., to configure different MCS (modulation and coding scheme). With different MCSs applied in the user equipments under different channel conditions, the efficiency of utilization can be improved in the physical layer.

MCS is a two-element pair containing a modulation scheme and an actual code rate. The modulation scheme can be QPSK, 16 QAM and so on. Given the modulation scheme, the lower the code rate is, the more protection is obtained to information bits, and given the code rate, the more protection is obtained to information bits with lower-level modulation scheme. To achieve the same link performance, UEs in good channel conditions can use comparatively higher code rate for data transmission while those in poor channel conditions should adopt comparatively lower code rate for data transmission. Values for MCS can be configured dynamically, statically or semi-statically by the system.

Present discussion in LTE to the uplink control signaling involves in the discussion to a Data Associated Signaling and a Non Data Associated Signaling. Data Associated Signaling consists of HARQ information and Transmission Format (TF) information. Non Data Associated Signaling consists of uplink Scheduling Request (SR) information; uplink ACK/NACK information, which is an acknowledgement to whether the downlink transmission data is correctly received by the uplink; and CQI (channel quality indication) information, which indicates the quality of the downlink physical channel. If there is no uplink data, the uplink control signaling is transmitted through the pre-configured frequency. As shown in FIG. 4, the pre-configured frequency areas are distributed in the two ends of the frequency band. In addition, to make use of the frequency diversity effect, a UE's uplink control signaling is transmitted through two slots in the ends of the frequency band in a TTI, i.e., through the first slot (401) in the upper of the frequency band and the second slot (402) in the lower of the frequency band, or through the first slot (403) in the lower of the frequency band and the second slot (404) in the upper of the frequency band. In the case that some uplink data is in transmission, UE's uplink control signaling is transmitted through the uplink data channel resource allocated by eNodeB, and shares the TDM multiplexing scheme with the uplink data. In this way, UE's uplink control information is multiplexed together with the UE's uplink data before the process of Pre-DFT so as to obtain single-carrier property for the uplink signal.

In an LTE system, the technique of HARQ is applied as a very important physical layer transmission technique for data transmission. To implement HARQ, the receiver feeds back ACK (data is received correctly)/NACK (error in data receiving) information according to whether the data packet is received correctly or not. During the HARQ transmission of uplink data, it is necessary for eNodeB to transmit the downlink ACK/NACK information in response to the uplink data's transmission (hereinafter referred to as downlink ACK/NACK transmission). During the HARQ transmission for downlink data, it is necessary for UE to transmit the uplink ACK/NACK information in response to the downlink data's transmission (hereinafter referred to as uplink ACK/NACK transmission).

According to present discussion progress in LTE, either a FDM (Frequency Division Multiplexing) scheme or a hybrid FDM/CDM (Frequency Division Multiplexing/Code Division Multiplexing) scheme can be applied by the UE in the downlink ACK/NACK channel. Here, FDM means that different UEs occupy different time frequency resources for ACK/NACK transmission. When ACK/NACK information is collectively transmitted through one OFDM symbol, the general FDM multiplexing scheme is shared by different UEs. While the ACK/NACK information is transmitted by distributing to several OFDM symbols, the hybrid FDM/TDM (time division multiplex) multiplexing scheme is actually shared by different UEs. For the convenience of description, the two multiplexing schemes are called FDM. FDM/CDM scheme means that different UEs share the hybrid multiplexing scheme of FDM and CDM in ACK/NACK channel, i.e., the physical resource (for ACK/NACK channel) is divided into several (greater than 2) parts in time and frequency domain, and the ACK/NACK information of different UEs is transmitted through each part of the physical resource by means of CDM multiplexing scheme.

According to discussion on ACK/NACK channel in LTE, the methods indicating which ACK/NACK channel is allocated to specific UE include an explicit indication method and an implicit indication method. These methods may be used for either the transmission of the uplink ACK/NACK information or the downlink ACK/NACK information.

In the explicit indication methods, a method is used to configure the dedicated channel for the transmission of ACK/NACK information, and transmit a UE's identifier and the corresponding ACK/NACK information. Since the UE's identifier is comparatively longer (e.g., 16 bit long) and ACK/NACK information is only one bit in general, this method is not economical in resource utilization so that it is not generally in service. Another explicit indication method means that an index allocated to a certain UE's ACK/NACK channel is contained in the control signaling which is used by eNodeB to allocate resource to the UE. Suppose that the total number of ACK/NACK channels in the system is N, it is necessary for the control signaling to contain $\log_2(N)$ (ceiling integer value) bits for the index of UEs' ACK/NACK channels allocated to UE.

In the implicit indication methods, a method is to define a one-to-one mapping relation between an index of the control signaling (which is used to allocate data resource for UE) and an index of ACK/NACK channel corresponding to the allocated data resource. For instance, suppose that the index of the control channel (allocated by eNodeB for UE) is k, and then the index of ACK/NACK channel allocated to this UE is also k. Another implicit indication method is to implicitly indicate the index of the ACK/NACK channel allocated to the certain UE according to the index of the radio resource block of the data resource allocated to the UE. For instance, suppose the index of the RB (radio resource block) of the first data allocated by eNodeB for UE is k, then the index of the ACK/NACK channel allocated to this UE is also k.

In the following, the description is focused on the design of the downlink transmission control channel in an LTE system, including the design of paging control channel, the uplink ACK/NACK channel and the downlink/uplink scheduling channel.

According to present discussion in LTE, in the design of the downlink control channel, a channel, which is called the paging channel (PCH), is used to control paging data, mainly transmitting the information on paging group identifier and the paging channel resource indicator. The paging data information is transmitted through the physical resource indicated by the paging control channel. To simplify the design of the downlink control channel, it is supposed in the standardization that the format of the paging control channel is kept the same as that of the downlink L1/L2 control channel, and the very paging channel is operated as a downlink shared channel (DL-SCH) for information transmission.

According to present discussion in LTE, in an LTE system, the uplink non-synchronous random access processing includes four main steps (please refer to FIG. 5 of present patent): at step 501, UE sends an uplink message 1, including a random selected Preamble; at step 502, eNodeB sends a receiving response message "Message 2", in which eNodeB uses RA-RNTI as a response channel identifier and allocates C-RNTI for the UE. The timing relationship of semi-syn is kept between step 2 and step 1, i.e., UE may wait for one TTI or several to receive "message 2" after it finishes sending "message 1". The length of the window may be configured semi-statically. The HARQ function is not applied in "message 2". In "message 2", responses may be made to several UEs; at step 503, UE sends "message 3", initiating the RRC connection request. Here, HARQ is applied; at step 504, eNodeB performs RRC contention resolution. Here, HARQ function is also applied.

According to present discussion in LTE, the downlink L1/L2 control channel includes the Downlink Scheduling channel and the Uplink scheduling channel or Uplink grant channel as well as the ACK/NACK channel (which is used to feed back response to the uplink data). In addition, it possibly includes the power control channel (which is used to transmit power control information) and other specific control channels. Since the ACK/NACK channel (which is used to feed back response to uplink data), the power control channel (which is used to transmit power control information) and other specific control channels use fixed or semi-fixed locations in all physical resources to transmit the downlink control information, for the convenience of specifying rules for discussion in present invention, the downlink L1/L2 control channel is specifically referred to channels including Downlink Scheduling channel and Uplink scheduling channel or Uplink grant channel.

The downlink and uplink scheduling channels are used to transmit downlink scheduling signaling and uplink scheduling signaling respectively. In present LTE system, it is supposed that eNodeB transmits the signaling through the former n (n is less than or equal to 3) OFDM symbols in each TTI. The signaling mainly includes UE-ID, the corresponding downlink or uplink physical resource allocation locations and HARQ, MIMO relevant information. In this case, UE-ID is used by the UE to perform UE-ID correlation operation to the received downlink signal so as to determine whether the signal is transmitted to this UE or not, then according to the physical resource indication information in the control signaling, the UE obtains the data channel's physical position and reads out the corresponding data. According to present research progress in LTE, two sequence orders may be used by eNodeB to transmit different UEs' scheduling signaling. As shown in FIG. 6 of present invention, 601, 602, ..., and 636 represent the corresponding logic numbers of the fundamental control RBs for the transmission of control channel.

In present invention, suppose that the fundamental physical control channel RB is the fundamental physical unit applied to transmit downlink L1/L2 control channel information. It consists of certain number of OFDM sub-carriers which are distributed in time and frequency domain. Then logically sort all fundamental physical control channel RBs that are used to transmit scheduling channels (including all downlink scheduling channels and uplink scheduling channels) to obtain the RBs' logic numbers, i.e., 601, 602, ... and 636 as shown in FIG. 6. When transmitting scheduling signaling, some criteria should be followed to select the logic number(s) (with this criterion, during the process of selecting the number of the logic numbers, it is necessary to consider MCS value and which specified fundamental physical control channel RBs can be applied in the locations where the scheduling channel can utilize) of either one basic fundamental physical control channel RB or several, then according to the corresponding relation, the corresponding fundamental physical control channel RBs should be obtained for the transmission of control signaling.

According to present research progress in LTE, two methods are proposed for transmitting scheduling information: with the first method, the downlink scheduling signaling of all UEs (that need to transmit scheduling information) is transmitted from the beginning to the end via the locations numbered by the RBs' logic numbers, and the uplink scheduling signaling of all UEs (that need to transmit scheduling information) is transmitted from the very end to beginning via the locations numbered by the RBs' logic numbers. Then following this order, different UEs' downlink or uplink scheduling signaling is transmitted. With the second method, the scheduling signaling is transmitted completely adaptively with no extra constraints on the order of the transmission of uplink or downlink scheduling signaling. The advantage of method one is that it may reduce the number of UE's blind detections, but it would waste some physical resources. No waste of physical resource exists in method two, but the number of UE's blind detections is greater than that of method one.

After analysis to the design of paging control channel in LTE, ACK/NACK channel and uplink/downlink scheduling channel, some disadvantages have been found to present design. Now explanations will be given in the following three aspects:

First, the paging control channel is special compared with the general L1/L2 control channel. However, their property has not been fully considered in present channel design. Through a paging channel, the paging information can be transmitted to one paging group or several and the ID transmitted through the paging control channel is not a certain UE's ID but a Paging Group ID. Therefore, in virtue of matching the Paging Group ID, a UE may determine whether the paging information is for him/her or not. Suppose that eNodeB transmits the paging control channel information through a specific location, UE matches the Paging Group ID with these specific locations to find if there is any paging control channel so that it (who is in Idle Mode) can utilize only detecting process to determine whether there is any paging message for him/her or not. Meanwhile, when it is necessary for this location not to transmit any paging control channel information, it is used to transmit other downlink L1/L2 control channels. In this way, for the UE in Active Mode, it can detect this location after it performs blind detection to other locations where any downlink L1/L2 control channels would be transmitted. In this way, the probability of unnecessary blind detection performed by the UE in Active Mode to the location when this location is used to transmit the paging control channel.

In a second aspect: it is necessary to apply HARQ function in "message 3" in the design of uplink access process. So that it is necessary to design the ACK/NACK channel to confirm whether "message 3" has been correctly received by eNodeB or not. In present LTE system, suppose that this kind of ACK/NACK channel is implicitly bound to the control channel of message 2, i.e., this ACK/NACK channel shares the same downlink channel number as that of the message 2's control channel. However, since message 2 may contain several response messages for UEs, this bind criterion results in that different ACK/NACK channels of different UEs responses to message 3 share the same channel numbers. Therefore, contradictions may come across in different UEs' channel resources. So that it is necessary to find a scheme to settle these contradictions.

In the third aspect: at present, it is necessary for UE to perform several blind detections to the downlink/uplink scheduling channels. So that further optimization may be performed on the design in this aspect.

SUMMARY OF THE INVENTION

The object of this invention is to provide a device and method for transmitting control channels with pre-allocated resource.

According to one aspect of present invention, a method for an eNodeB transmitting control channels with pre-allocated resources comprising steps of:

a) the eNodeB determining whether to transmit the control channels according to its needs;

b) the eNodeB transmitting the control channels with pre-allocated resources according to properties of the channel to be transmitted.

According to another aspect of present invention, a device for an eNodeB transmitting control signaling with pre-allocated resources comprising a transmitting/receiving means and further comprising:

a) a control signaling generator, for the eNodeB determining whether to transmit the control signaling;

b) a physical channel multiplexer, for multiplexing the control signaling together with downlink user data to form a physical channel;

c) a control signaling transmission module, for the eNodeB transmitting the control signaling with pre-allocated resources according to properties of the signaling that needs to be transmitted;

d) a physical channel de-multiplexer for de-multiplexing the uplink user data and the uplink control channels.

According to another aspect of present invention, a device for a UE receiving a control signaling transmitted from an eNodeB via pre-allocated resources comprising a transmitting/receiving means and further comprising:

a) a control signaling receiving module, for the UE receiving the control signaling at a prescribed resource location;

b) a physical channel de-multiplexer, for de-multiplexing downlink user data and downlink control channel;

c) a control signaling interpreter, for determining whether the eNodeB transmits control signaling to the UE or not and then processes the control signaling;

d) a physical channel multiplexer, for multiplexing uplink user data together with a uplink control signaling to form a physical channel.

According to another aspect of present invention, a method for indicating an ACK/NACK channel for a random access message 3 comprising steps of:

a) a UE transmitting a random access preamble;

b) an eNodeB transmitting a random access message 2, to indicate a fundamental ACK/NACK channel transmitted over a downlink, by means of the fundamental ACK/NACK channel, obtaining message 3 ACK/NACK channels corresponding to the preambles implicitly according to orders that responding messages responded by the eNodeB is in the message 2;

c) the UE transmitting the random access message 3 according to a mechanism of HARQ, and the eNodeB transmitting ACK or NACK information over the ACK/NACK channel indicated by the message 2;

d) eNodeB transmitting a random access message 4.

The present invention is used to transmit the downlink paging control channel, the RACH access Message 3's ACK/NACK channel, the downlink scheduling channel and the uplink scheduling channel. With the method proposed in present invention, operations in the receiving end are simplified so that time spent in receiving signaling is shortened and power consumption is well reduced.

BRIEF DESCRIPTION OF THE DRAWINGS

Figure 6:
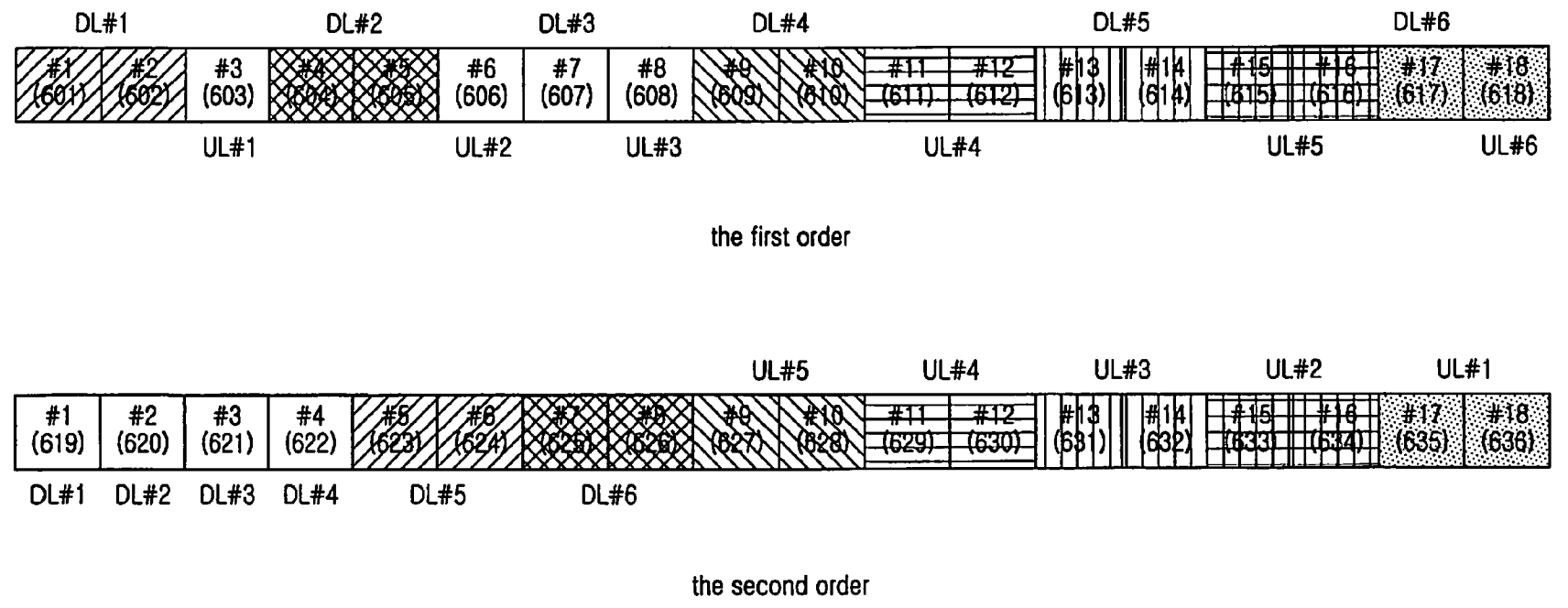

FIG. 6 is two orders used by an uplink/downlink scheduling channel in allocating the logic numbers to the control channels.

DETAILED DESCRIPTION OF THE PREFERRED EMBODIMENTS

Figure 1:
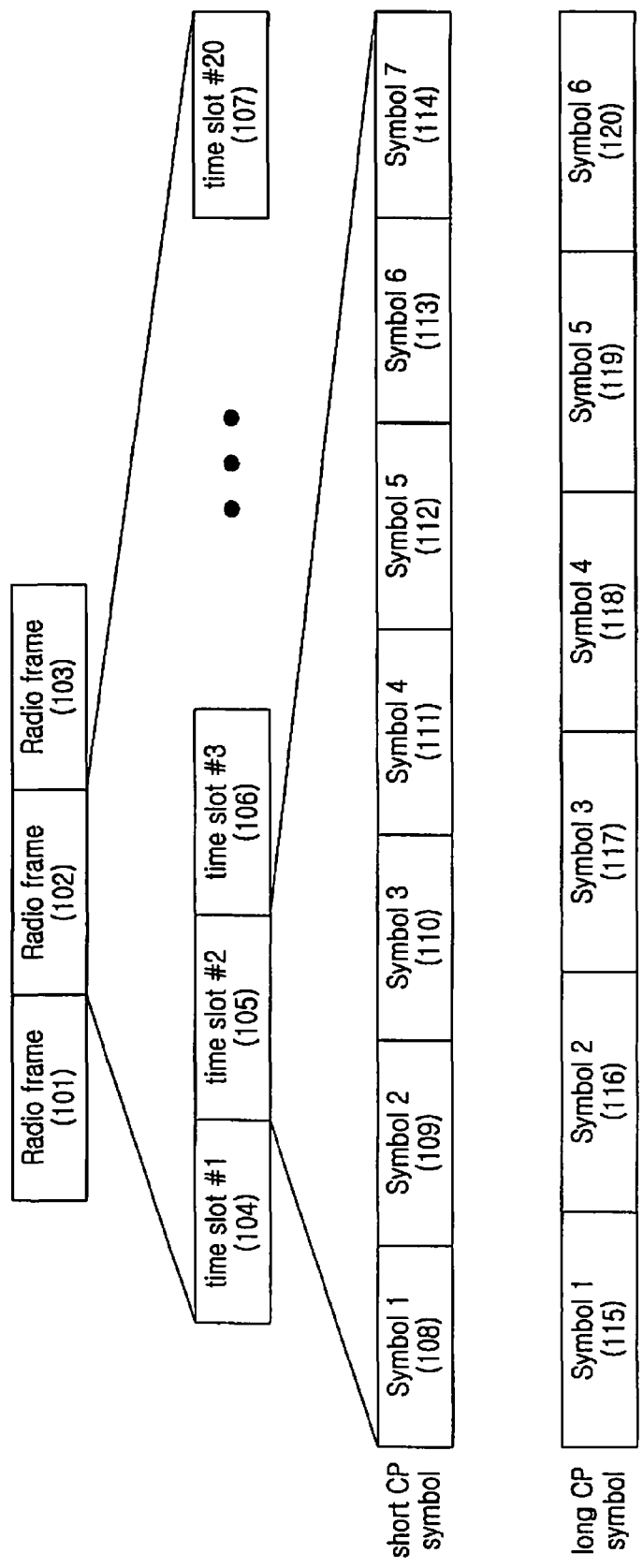
FIG. 1 is a downlink frame structure of the LTE system.
Figure 2:
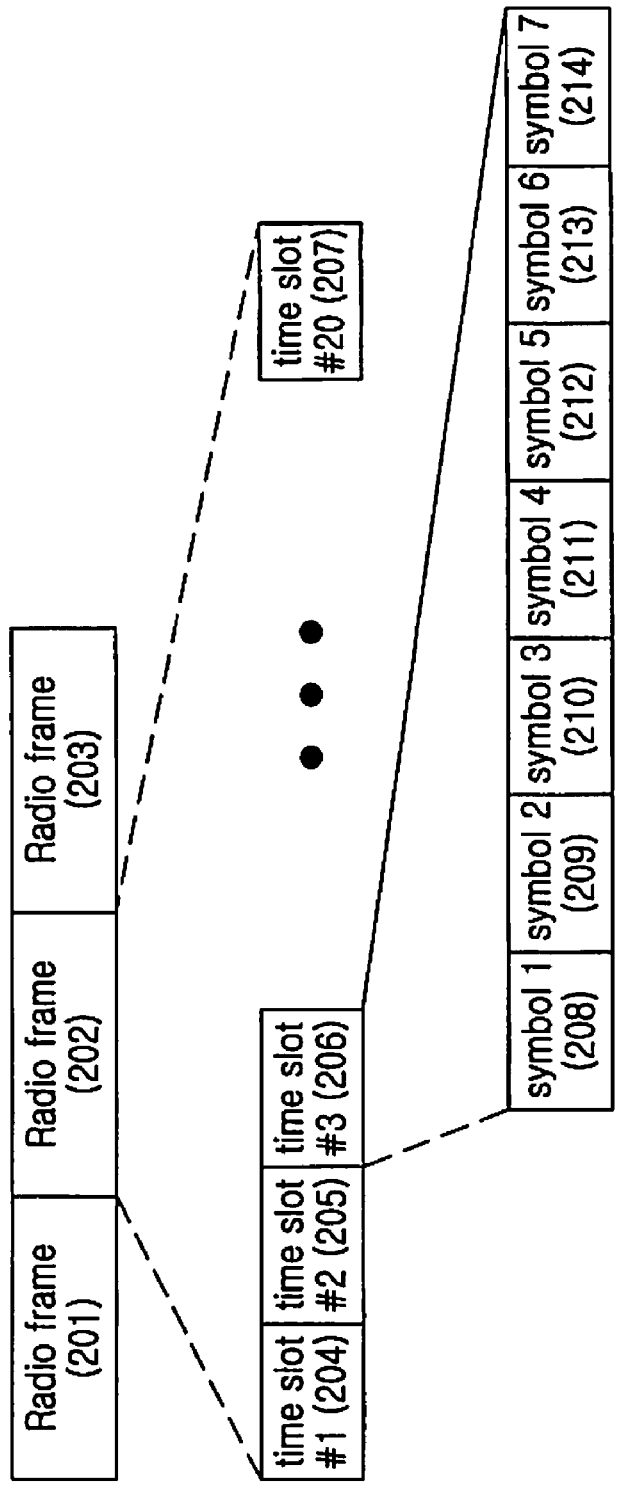
FIG. 2 is an uplink frame structure of the LTE system.
Figure 3:
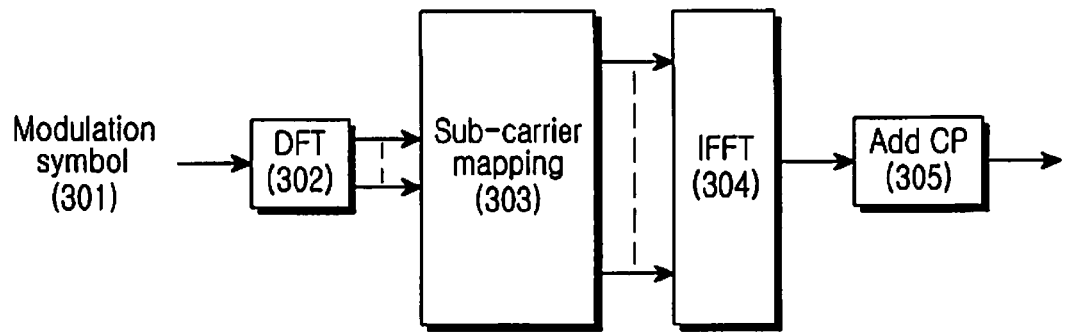
FIG. 3 is a processing flow for SCFDMA signal.
Figure 4:
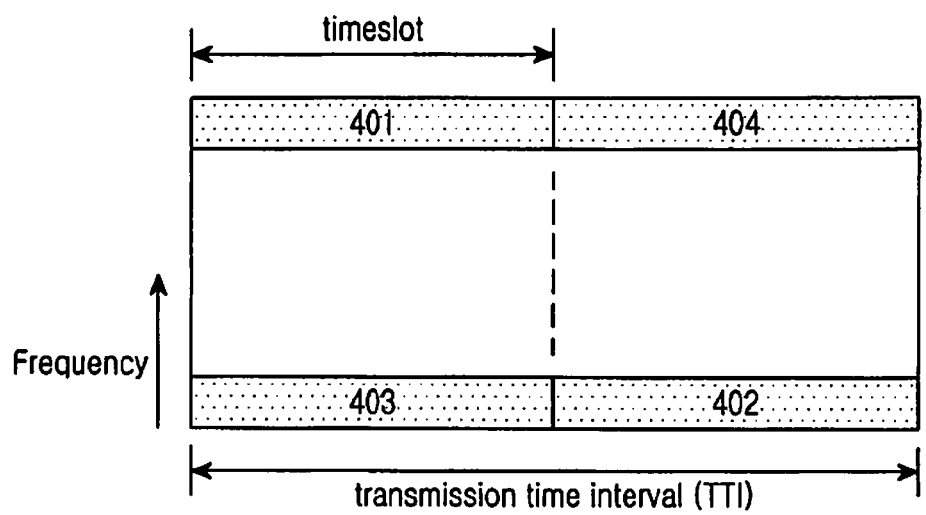
FIG. 4 is a structure of an uplink control channel.
Figure 5:
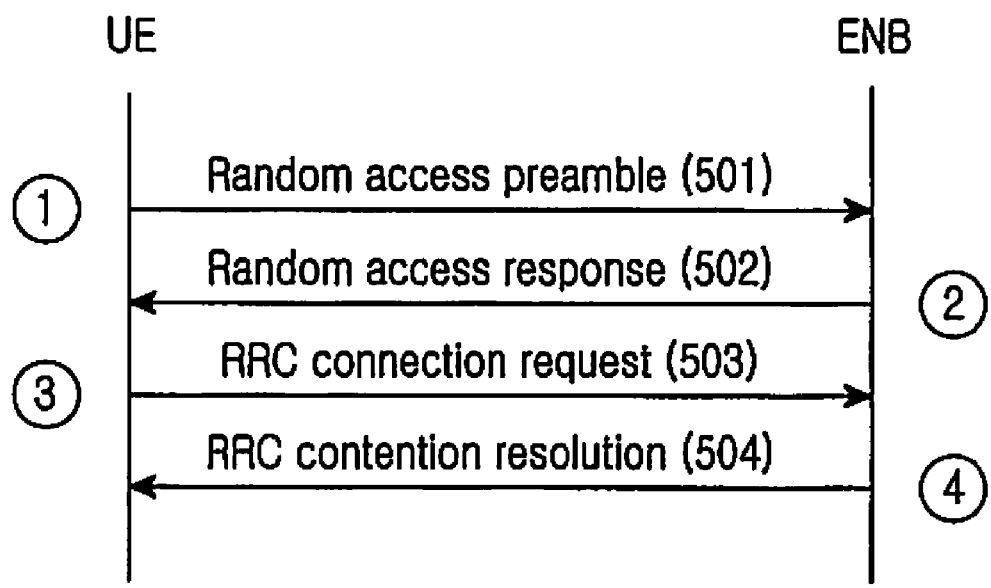
FIG. 5 is a LTE uplink random access process.

In present invention, a device and method for transmitting control channel with pre-allocated resources according to properties of the control channel is proposed for a wireless communication system. The present invention may be applied in certain control channels such as a downlink scheduling channel (or a scheduling channel for downlink data transmission), an uplink scheduling channel (or an uplink grant channel for uplink data transmission), a paging control channel, a random access message 3 ACK/NACK channel and a downlink Persistent Scheduling Channel for VoIP.

According to the properties of some downlink control channels, a criterion is regulated on channel resources in advance by both the transmitting end and receiving end. Then, in accordance with the criterion, the transmitting end transmits a control signaling via the pre-allocated resources, and the receiving end receives the data via the pre-allocated resource locations. With the other information, the prescribed criterion specifies detailed physical resource locations for the control channel.

For instance, the other information may include: a ratio between a total number of scheduling channels (including the downlink scheduling channel and the uplink scheduling channel, which are dynamically, statically or semi-statically configured by the system), a number of uplink scheduling channels and a number of downlink scheduling channels, a total number of separately configured downlink scheduling channels and a number of separately configured uplink scheduling channels, or a total number of configured downlink L1/L2 control channels and the resource location and number occupied by the downlink ACK/NACK channels, a total number of configured downlink L1/L2 control channels and the resource and location occupied by MCS information (which is used by the control channel) and the downlink Persistent Scheduling Channel for VoIP, and so on.

Now, detailed embodiments are given to the paging control channel, the random access message 3 ACK/NACK channel and the downlink/uplink scheduling channel in present invention respectively.

In part one of present invention, an embodiment of paging control channel is described:

The UE in LTE has two modes such as an Idle Mode and an Active Mode. The UE in idle mode needs to be waked up at system regulated moment to read the paging information so as to learn about whether there is any data arrival or modifications to system information, etc. or not. After the UE wakes up at the specific moment, it first may read the paging control channel. By matching with the Paging group ID, it determines whether there is any paging channel transmitted for it or not. If yes, it finds out the paging information for it via the physical resource locations that are utilized by the paging data channel but indicated by paging control channel. According to this kind of property of the paging channel, present invention proposes a method to transmit paging control information with the pre-allocated paging control channel's resource locations.

For the convenience of description, the paging control channel is supposed to be a part of the scheduling channel in present invention. So that the logic number of fundamental control channel RBs (utilized by the paging control channel) is counted in the total number of the logic number of uplink/downlink scheduling channels.

In addition, it is also supposed that the total number of logic number of fundamental control channel RBs (which are dynamically, statically or semi-statically configured by the system) occupied by uplink/downlink scheduling channels is Nt. For the convenience of description, it is supposed that a downlink paging control channel be a downlink scheduling channel, so that its logic number is also counted in the total number Nt.

In addition to the direct dynamic configuration of the value of Nt, the system may also adopt methods on configuring other information to configure the total number of the logic number of RBs. For example, the system respectively dynamically, statically or semi-statically configures the number of the logic number of the RBs occupied by the downlink scheduling channels and by the uplink scheduling channels. This is equivalent to directly configure the total number of logic number of fundamental control channels occupied by the uplink/downlink scheduling channels. Moreover, the system respectively configures start and end positions of the logic number of the RBs occupied by the downlink scheduling and the uplink scheduling channels. This is equivalent to that the system directly configures the total number of the logic number of the RBs occupied by the uplink/downlink scheduling channels. In another example, the system has only configured the location of the OFDM symbol in a certain TTI where the downlink L1/L2 control channel ends. In this way, the transmitting end learns the total number of the logic number of RBs occupied by the uplink/downlink scheduling channels. This is also equivalent to that the system has directly configured the total number of the logic number of RBs occupied by the uplink/downlink scheduling channels.

During the process that the system specifies the logic number to the RBs of the fundamental control channels, a one-to-one mapping relationship is established between the logic numbers and the RBs of the fundamental control channels. Once the logic number is known, it is known that which channel RB (i.e., the radio physical resource block) the system is utilizing. For the convenience of description, the logic number specified for RBs utilized by channels starts from 0 and stops at (Nt−1).

In the following, rules proposed in present invention are given:

Suppose that the logic number of the RBs occupied by paging control channel starts from Xp (0<Xp<Nt−1), and the total number of the fundamental physical control RBs occupied by the downlink scheduling channels is Nd, the total number of the fundamental physical control RBs occupied by the uplink scheduling channels is Nu, and Nt, Nu and Nd may be configured statically, semi-statically or dynamically by the system. In present invention, it is prescribed that the logic number of the fundamental physical control RBs utilized by the paging control channel starts from Xp=Nt*Nd/(Nd+Nu) (if Xp is not an integer, an integer obtained by rounding is selected as the starting position of the logic number of the paging control channel, but this operation may be prescribed and only one should be chosen in the prescription). When the number of the logic numbers of the downlink scheduling channels is equal to that of the uplink scheduling channels, i.e., Nd=Nu, then according to rules in present invention, the logic number of the RB (one or several) utilized by the paging control channels may start from ($\lfloor Nt/2 \rfloor$) or ($\lceil Nt/2 \rceil$).

In this case, if the paging control channel utilizes more than one fundamental resource blocks, then according to the number of RBs necessary for the paging control channel, the sequence orders such as backward, forward, backward, backward and backward are prescribed to specify the logic number of all other RBs utilized by the paging control channel.

In the case that more than one paging control channels are necessary to be transmitted within one TTI, according to the location specified for a paging control channel prescribed in the rule mentioned above, the method that all paging channels are arranged continuously in logic number is used to specify the starting logic number of RBs that other paging control channels utilize. All these logic numbers are arranged continuously, and the starting logic numbers of RBs that other paging control channels utilize are uniformly distributed in the adjacent two terminal points of the logic number specified for the first paging control channel. Furthermore, according to the number of RBs necessary for other paging control channels, the logic number of all RBs is specified for all other paging control channels.

In present invention, with the method for specifying the locations for the paging control channels, the object to specify the starting position of the logic number of the paging control channels may be reached also. Now, two methods for specifying the position for paging control channels are described.

The first method is to specify the median positions of all downlink L1/L2 control channels (if the median is not an integer, an integer obtained by rounding is selected as the position for the transmission of paging control channel; the rounding processing should be prescribed and only one process should be chosen in subsequent process) as the position to transmit paging control channels.

The second method is to specify the locations of Xp'=Nt'*Nd'/(Nd'+Nu') (Nt': the total number of downlink L1/L2 control channels, Nd': the number of downlink scheduling control channels in the downlink L1/L2 control channels, Nu': the number of uplink scheduling control channels in the downlink L1/L2 control channels) in all downlink L1/L2 control channels as the positions for the transmission of paging control channels. Here, Nt', Nu' and Nd' may be configured dynamically, statically or semi-statically. If Xp' is not an integer, an integer obtained by rounding is selected as the position for the transmission of paging control channel. The rounding process should be prescribed and only one process should be chosen in subsequent process.

In part two, the embodiment of message 3 ACK/NACK channel during the random access process is described:

According to present research in LTE, a RACH non-synchronous random access process is divided into four steps. In steps 1 through 4 messages 1 through 4 is transmitted respectively. In which, message 1 and message 3 are signaling information sent from the UE to eNodeB, and message 2 and message 4 are response signaling information sent from eNodeB to the UE. HARQ function is applied in message 3 and message 4. Since message 2 may contain response information that eNodeB responds to several UEs, eNodeB can not directly use the channel number of uplink scheduling (UL Grant) channel allocated for the transmission of message 2 data to transmit message 3 ACK/NACK channel. Otherwise, several UEs will use the ACK/NACK channel with the same number.

In present invention, two methods are proposed for ACK/NACK channel allocation:

The first method is to explicitly assign a logic channel number. eNodeB allocates different physical resources for different UEs' message 3 ACK/NACK channels when it transmits message 2. With this method, comparatively more downlink signaling is occupied so that more resource overhead will be made for message 2;

The second method is to implicitly allocate different physical resources corresponding to message 3 for possible several UEs included in message 2. In this method, no explicit resource allocation signaling is applied but with pre-allocated physical resources.

The first kind of methods in the second category is that: the system allocates given physical resources (the physical resources for each ACK/NACK channel consists of one fundamental control physical resource block or several. The definition of the fundamental control physical resource block is just the same as that mentioned above, i.e., that allocated for the transmission of control signaling information. The physical resource block is composed of a group of sub-carriers arranged in certain sequence in time and frequency domain. Logic numbers is specified to these fundamental control physical resources in sequence so as to establish a one-to-one mapping relationship between the logic number of the ACK/NACK channels and the fundamental channel physical RBs utilized for the transmission of ACK/NACK channels.) to all downlink ACK/NACK channels dynamically, statically or semi-statically.

The detailed rules are as follows: if the logic number of the fundamental control RBs occupied by ACK/NACK channels (which are used to respond to common data) starts from the beginning to the end, eNodeB selects logic numbers for message 3 ACK/NACK channels according to the logic number of the control channels from the end to the beginning, and transmits RACH message 3 ACK/NACK information via the corresponding physical resource locations.

If RACH message 2 contains several piece of UEs' ACK information, eNodeB may send information to different UEs through RACH message 3 ACK/NACK channels either according to the UEs' orders represented in message 2 or not. The final system rule is specified by making a tradeoff between the system flexibility and the embodiment complexity.

The second kind of methods in the second method is that: the basic steps are kept the same as that in the first kind of method in the second category, except that if the logic number of the fundamental control RBs occupied by ACK/NACK channels starts from the beginning to the end, eNodeB selects logic numbers for message 3 ACK/NACK channels according to the logic number of the control channels from the next of the one of the ACK/NACK channel that the last common data occupies, and transmits RACH message 3 ACK/NACK information via the corresponding physical resource locations.

In present invention, the key to this embodiment is to specify in advance the position of the logic number of ACK/NACK channel (which is used to transmit RACH message 3) relative to the logic numbers of all ACK/NACK channels.

This example process is realized by utilizing the concept of logic number to interpret how to specify in advance the position of the logic number of ACK/NACK channel (which is used to transmit RACH message 3) relative to the logic numbers of all ACK/NACK channels. During the patent's actual embodiment, other concepts like the channel resource position, etc. can be used to describe this process. The key of present invention is to specify in advance the relative position and this specification is independent of the applied concepts.

The description of the embodiment of present invention may be made by specifying the positions relative to either those of logic numbers of all ACK/NACK channels, or those of the logic number of all downlink L1/L2 control channels. The key is still to specify the relative positions. And this process is independent of the specification processed according to the logic number of all ACK/NACK channels.

The non-synchronous random access process contains four exchanging of information, denoted by message 1, message 2, message 3 and message 4 respectively. Message 1 is the random access preamble signal that UE transmits through the random access channel. UE can select a preamble from several available preambles to initiate the random access process. Several UEs may simultaneously transmit consistent or different preambles through the random access channel. eNodeB detects every possible preambles through the random access channel and transmits response messages to the detected preamble. If eNodeB has detected several preambles, it sends several response messages to these preambles. The response message transmitted from eNodeB is called message 2. The method for transmitting message 2 is that: eNodeB first allocates downlink physical shared channel (PDSCH) resources via the downlink physical control channel (PDCCH), and then transmits one preamble's response message or several through PDSCH. After the UE receives message 2 from eNodeB, it reads out the preamble's response message and then sends message 3 through the uplink resources allocated by message 2. If message 2 contains several preambles' response messages, all the corresponding UEs send message 3 respectively. Message 3 is based on the transmission mechanism of HARQ. After receiving message 3, eNodeB performs relevant process and feeds back message 4. Since message 3 is based on the transmission mechanism of HARQ, it is necessary to indicate the applied ACK/NACK channel during the HARQ transmission process.

A method for indicating the ACK/NACK channel applied to perform HARQ transmission of message 3 is to explicitly indicate a fundamental ACK/NACK channel transmitted through the downlink, then based on this ACK/NACK channel, implicitly obtain all preambles' corresponding message 3 ACK/NACK channels according to the sequence orders of the response messages included in message 2 in which eNodeB responds to all preambles. This fundamental ACK/NACK channel's indication information may be transmitted through either the PDCCH allocated for message 2 or PDSCH allocated for message 2. This fundamental ACK/NACK channel's indication information can be either the index of the ACK/NACK channel, or the combination of other information. If message 2 contains the response message to only one preamble, the HARQ transmission of message 3 corresponding to this preamble is performed via the fundamental ACK/NACK channel.

When message 2 contains response messages to several preambles, one method is to allocate relevant ACK/NACK channels for the preambles in turn starting from the fundamental ACK/NACK channel according to the sequence order of the response messages to the preambles in message 2. Here, ACK/NACK channels are allocated in an ascend order or a descend order starting from the fundamental ACK/NACK channel. For instance, it is supposed that message 2 contains M preambles' response messages. These M preambles are called the $m^{th}$ one (where m=0, 1, ..., M−1) according to the corresponding response message's order in message 2. Let the index of the fundamental ACK/NACK channel is k, then the index of message 3 ACK/NACK channel for the $m^{th}$ preamble is k+m. If message 2 contains several response messages for the preambles and the fundamental ACK/NACK channel is indicated by the combination of several parameters, the parameter value of corresponding ACK/NACK channel is obtained according to factors such as the sequence order of the response messages in message 2, the values of the parameters of the fundamental ACK/NACK channel, and some rules.

Suppose that PDCCH is obtained through combination of several control channel elements (CCE). A method for determining the ACK/NACK channel for HARQ transmission is to implicitly obtain the index of the ACK/NACK channel transmitted through the uplink according to the index of the CCE occupied by the downlink scheduling PDCCH; and vice versa, according to the index of the CCE occupied by the uplink scheduling PDCCH, the index of the ACK/NACK channel transmitted through corresponding downlink can be implicitly obtained. The method to indicate the ACK/NACK channel for HARQ transmission of message 3 is to implicitly obtain the index of a fundamental ACK/NACK channel transmitted in the downlink according to the index of the CCE occupied by downlink PDCCH allocated for message 2, then based on this fundamental ACK/NACK channel, implicitly obtain all preambles' corresponding message 3 ACK/NACK channels according to the sequence orders of the response messages included in message 2 in which eNodeB responds to all preambles. If the PDCCH allocated for message 2 is composed of several CCEs, the index of the ACK/NACK channel is implicitly obtained according to the index of one CCE. For instance, according the index of the first CCE, we can implicitly obtain the index of the corresponding ACK/NACK channel.

In present invention, no restriction is declared on which the index of the CCEs could be used. If message 2 contains the response message to only one preamble, the HARQ transmission of message 3 corresponding to this preamble is performed via the fundamental ACK/NACK channel. If message 2 contains response messages to several preambles, one method is to allocate relevant ACK/NACK channels for the preambles in turn starting from the fundamental ACK/NACK channel according to the sequence order of the response messages to the preambles in message 2. Here, ACK/NACK channels are allocated in ascend order or descend order starting from the fundamental ACK/NACK channel. For instance, suppose message 2 contains M preambles' response messages. These M preambles are called the $m^{th}$ one (where m=0, 1, ..., M−1) according to the corresponding response message's order in message 2. Let the index of the fundamental ACK/NACK channel is k, then the index of the $m^{th}$ preamble's message 3 ACK/NACK channel is k+m.

In part three, the embodiment process of the design of downlink/uplink scheduling channel is given:

According to present research progress in LTE, if there is any downlink data or uplink data to be transmitted, it is necessary for eNodeB to transmit corresponding downlink scheduling signaling or uplink scheduling signaling within the former n (n is less than or equal to 3) symbols in some slots for the data needed to be transmitted. However, according to the methods proposed in present research, it is necessary for UE to determine whether there is any scheduling channel transmitted to the UE or not by performing UE-ID blind detection to all possible physical resource locations occupied by control channels. With this method, a great deal of blind detection must be performed by UE.

A method capable of reducing the UE blind detection is proposed in present invention. This method is that: for the UE that simultaneously needs the uplink and downlink scheduling channels (for simplification, call this kind of UE A-type UE), following sequence order is prescribed for transmission: (1) the sequence order of logic number of the downlink scheduling channel of some UE in the A-type UE is prescribed as to use the starting position of the logic numbers of all scheduling channels as the starting position of the logic number of the A-type UE, then after the A-type UE's downlink scheduling channels are transmitted according to the total logic numbers for the A-type UE, the logic numbers of the downlink scheduling channels of other UEs in the A-type UE are arranged in the order from the beginning to the end; the logic numbers of the uplink scheduling channels of A-type UE are arranged in the order starting from the end of the logic numbers of all scheduling channels, then the logic numbers of the uplink scheduling channels of the UE and other UEs in the A-type UE. In this way, the physical resources necessary for transmission are well configured for all scheduling channels of A-type UE; (2) the sequence order of logic number of the downlink scheduling channel of the UEs that only need to transmit the downlink scheduling information (for the convenience of description, call this kind of UE B-type UE) is prescribed as to use the next logic number to the one of the last scheduling channel occupied by the last A-type UE as the starting position of the logic number of the B-type UE, then the logic numbers of all B-type UEs' downlink scheduling channels are arranged in the order from forward to backward; (3) the sequence order of logic number of the uplink scheduling channel of the UEs that only need to transmit the uplink scheduling information (for the convenience of description, call this kind of UE C-type UE) is prescribed as to use the next logic number to the one of the last uplink scheduling channel occupied by the last A-type UE as the starting position of the logic number of the C-type UE, then the logic numbers of all C-type UEs' uplink scheduling channels are arranged in the order from backward to forward.

According to that rule, eNodeB configures the physical resources necessary signaling transmission for A-type UE, B-type UE and C-type UE. It is not necessary for a certain UE (either A-type, B-type or C-type) to learn about which type it belongs to at the beginning of the search process, but after it finds a matched downlink or uplink scheduling channel according to the sequence order from the beginning to the end or from the end to the beginning, it should be supposed to belong to A-type. Then another UE-ID matching process is performed according to the prescribed rule to determine whether there is another uplink or downlink scheduling channel is transmitted to the UE simultaneously or not. If the matching process is successful, the assumption is OK, i.e., the UE belongs to A-type; otherwise, the UE belongs to either B-type or C-type.

Another rule may be applied in the embodiment of present invention: when configuring the logic numbers for A-type UEs' scheduling channels, eNodeB uses the first of the logic numbers of all scheduling channels as a starting logic number of A-type UE's downlink scheduling channel, then uses the one next to the end position of the same A-type UE's downlink scheduling channel to transmit the uplink scheduling channel for the same A-type UE. Similarly, eNodeB finishes configuring logic numbers for all A-type UE's scheduling channels. The rule for transmitting B-type UE's scheduling channels is that: eNodeB uses the logic number next to the one that all A-type UE's scheduling channels stop as the starting logic number for the transmission of B-type UE's scheduling channels, then transmits scheduling information to all other B-type UEs according to the order from forward to backward. The rule for transmitting C-type UE's scheduling channels is that: eNodeB uses the logic number next to the one that all B-type UE's scheduling channels stop as the starting logic number for the transmission of C-type UE's scheduling channels, then transmits scheduling information to all other C-type UEs according to the order from forward to backward.

With this prescribed rule, when the UE detects that eNodeB has transmitted a scheduling channel to it, it is only necessary to perform blind detection in the next logic number position to determine whether eNodeB has simultaneously transmitted another scheduling channel to it, then the UE finishes the detecting process.

In the two rules mentioned above, the B-type UE may be switched with the C-type UE. That is to say, in either of the rules above, the logic numbers of B-type UE may be first or that of C-type UE can be first.

If certain type of UE (e.g., either A-type, B-type or C-type) does not happen during the transmission process, for instance, there exists no UE that needs uplink and downlink scheduling information simultaneously, or that needs only the downlink scheduling information, or that needs only the uplink scheduling information, no corresponding information is transmitted. In this case, the steps for transmitting corresponding control information to A-type, B-type or C-type UE may be skipped.

According to present technical discussion in LTE, when transmitting A-type UE's scheduling channel following the rules of present invention, eNodeB may adopt several levels of MCS in uplink and downlink scheduling channels. In this case, either the downlink channel MCS level is more than one, or the uplink channel MCS level is more than one, or both. Although the scheduling channel's MCS level is unique for a specific UE during a transmission of scheduling information, the UE does not know the exact MCS level. So that it is necessary for the UE to suppose there be more MCS levels and correspondingly perform several blind detections, especially when both the MCS levels of the uplink scheduling channel and the downlink scheduling channel are greater than one. Therefore, the number of blind detection will be much greater.

In present invention, a rule is proposed to reduce such blind detection. In detail, this rule is to keep a certain mapping relationship between the MCS of the UE's downlink scheduling channel and that of the UE's uplink scheduling channel. Then, after the UE succeeds in detecting the MCS information for its own with blind detection, it obtains some information on downlink scheduling or uplink scheduling according to the mapping relationship. In this way, the number of blind detection process is reduced during performing blind detection to downlink scheduling or uplink scheduling information.

Figure 7:
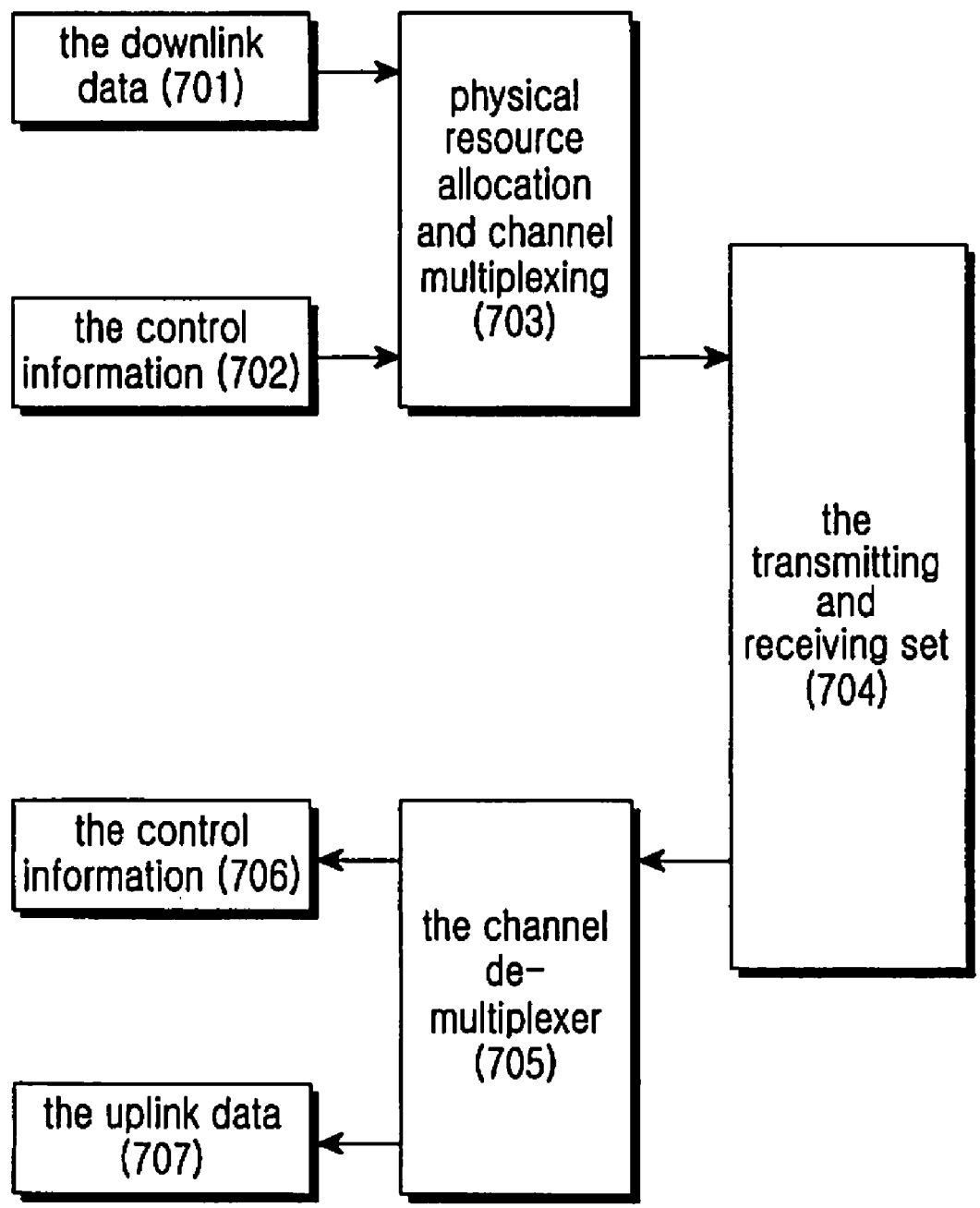
FIG. 7 is equipments for eNodeB to process the control channel.

FIG. 7 shows equipments for eNodeB to process a control channel. Here, the equipments include a control channel generator (702), a physical resource allocation and channel multiplexer (703), a physical channel de-multiplexer (705) and a transmitting/receiving means (704). They are the embodiments of present invention. As shown in FIG. 7, eNodeB specifies the UEs needed to be scheduled and allocates radio resources for them, then in the control signaling transmitter (702), it generates control signaling respectively for each UE to be scheduled. Now, according to the special properties of the control signaling and the prescribed rules, it multiplexes (703) the signaling at the prescribed physical resource locations and transmits the control channels (704). eNodeB receives the uplink control information (706) with the receiving means (704), and de-multiplexes out the information from the UE with the physical channel de-multiplexer (705).

Figure 8:
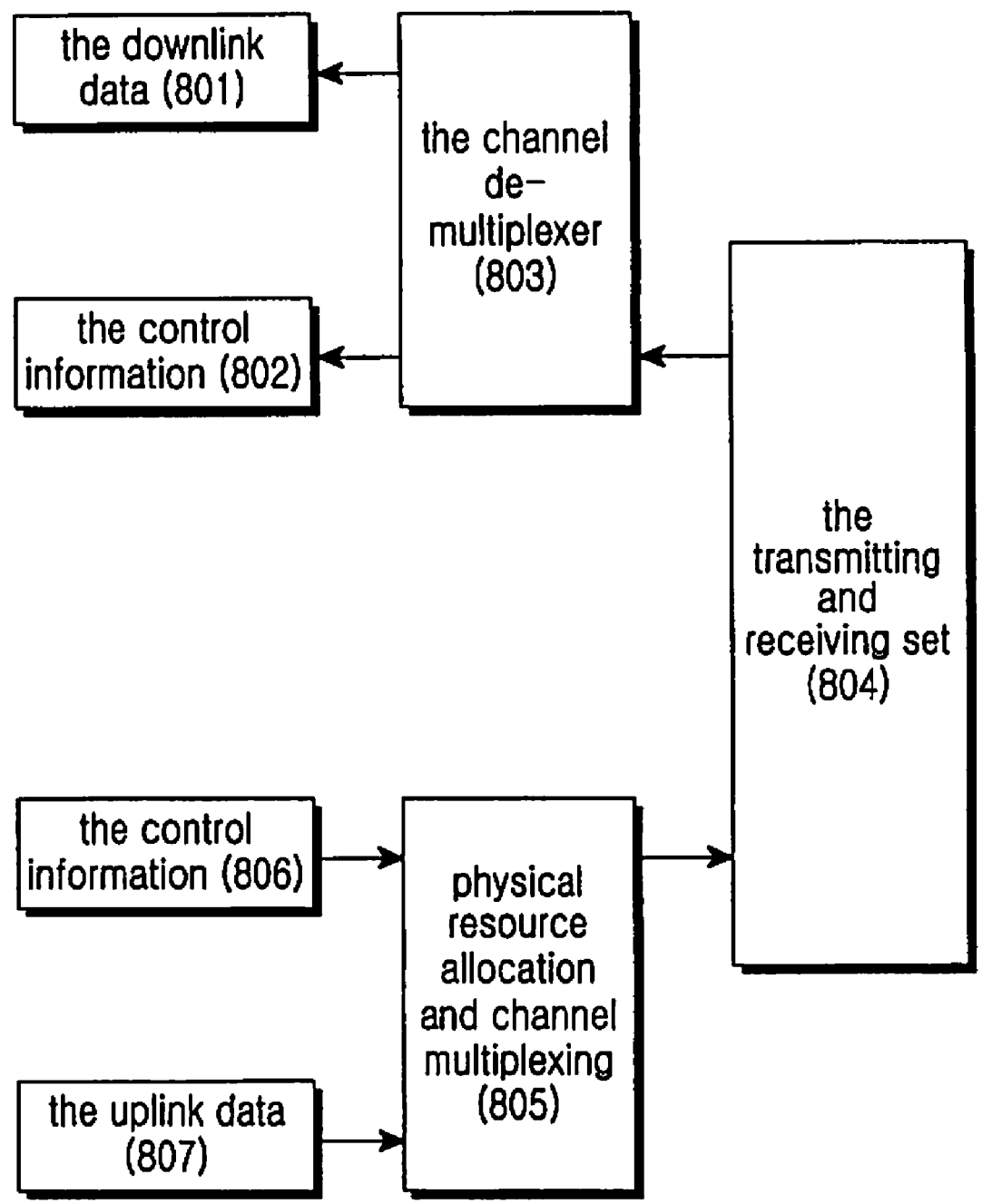
FIG. 8 is equipments for the UE to process the control channel.

FIG. 8 shows equipment for the UE to process the control information. Here, the equipments include a control channel interpreter (802), a physical channel de-multiplexer (803), a physical channel multiplexer (805) and a transmitting/receiving means (804). They are the embodiments of present invention. As shown in FIG. 8, through the receiving means (804) and the physical channel de-multiplexer (803), the UE first detects the corresponding control channel via the prescribed physical resource positions. Then, with the control channel interpreter (802), the UE determines whether eNodeB has transmitted any control channel to it. If not, the UE regards that eNodeB have not asked it to perform data transmission. Otherwise, UE performs corresponding data receiving/transmitting. To the downlink scheduling and uplink control information transmission, the UE de-multiplexes out the downlink data (801) with the physical channel de-multiplexer (803) and generates the uplink control channel (806). Then, it multiplexes the uplink control channel (806) together with uplink data (807) through the physical channel multiplexer (805) and transmits it through the transmitting means (804).

Embodiment

This part gives 11 embodiments of this invention. To avoid making the description tedious, detailed description on well-known functions or devices is omitted in the following description.

A first embodiment

In this embodiment, eNodeB transmits the paging control channel via the pre-allocated physical resource locations according to the prescribed rules.

The rule in this embodiment is applied to specify logic number (the continuous fundamental control channel physical RBs in logic may be discontinuous in physical and the fundamental physical channel resource consists of a group of OFDM sub-carriers.) for all fundamental control channel physical RBs that can transmit downlink L1/L2 control channels (for the convenience of description, the downlink L1/L2 control channels here refer to the whole of the downlink scheduling channels, the uplink scheduling channels and the paging control channels. In LTE technique, L1/L2 channels also include such downlink control channels as the ACK/NACK channels, the power control channels and so on. Among these channels, since the physical resources utilized by the control channels of the scheduling channels can be specifically configured, the downlink control channels that can be allocated dynamically mainly include the downlink and uplink scheduling channels of the paging control channels.), and chooses the median (if this value is not an integer, a rounding operation will be performed) of the logic numbers as the starting position of the control channels that are used to transmit paging control channels.

The operation performed by eNodeB as follows: whether it is necessary to transmit paging control channels to some UE in Idle state within the cells of eNodeB through a slot in some TTIs is determined according to its needs. If yes, eNodeB selects the logic number that satisfies the requirements for the transmission of paging control channel according to the prescribed rules. Then, it finds out the physical resources' detailed positions in TTI according to the corresponding relationship between the logic number and the physical resource and then transmits paging control information via the found positions.

The operation performed by the UE as follows: the UE in idle state periodically wakes up (the sleep interval is configured by the network) to receive the control channel information from eNodeB. Then, the UE obtains the logic number for the transmission of paging control channel according to the prescribed rules. Now, the UE finds out the physical resources' detailed positions in TTI according to the corresponding relationship between the logic number and the physical resource and then receives paging control information via the found positions.

Figure 9:
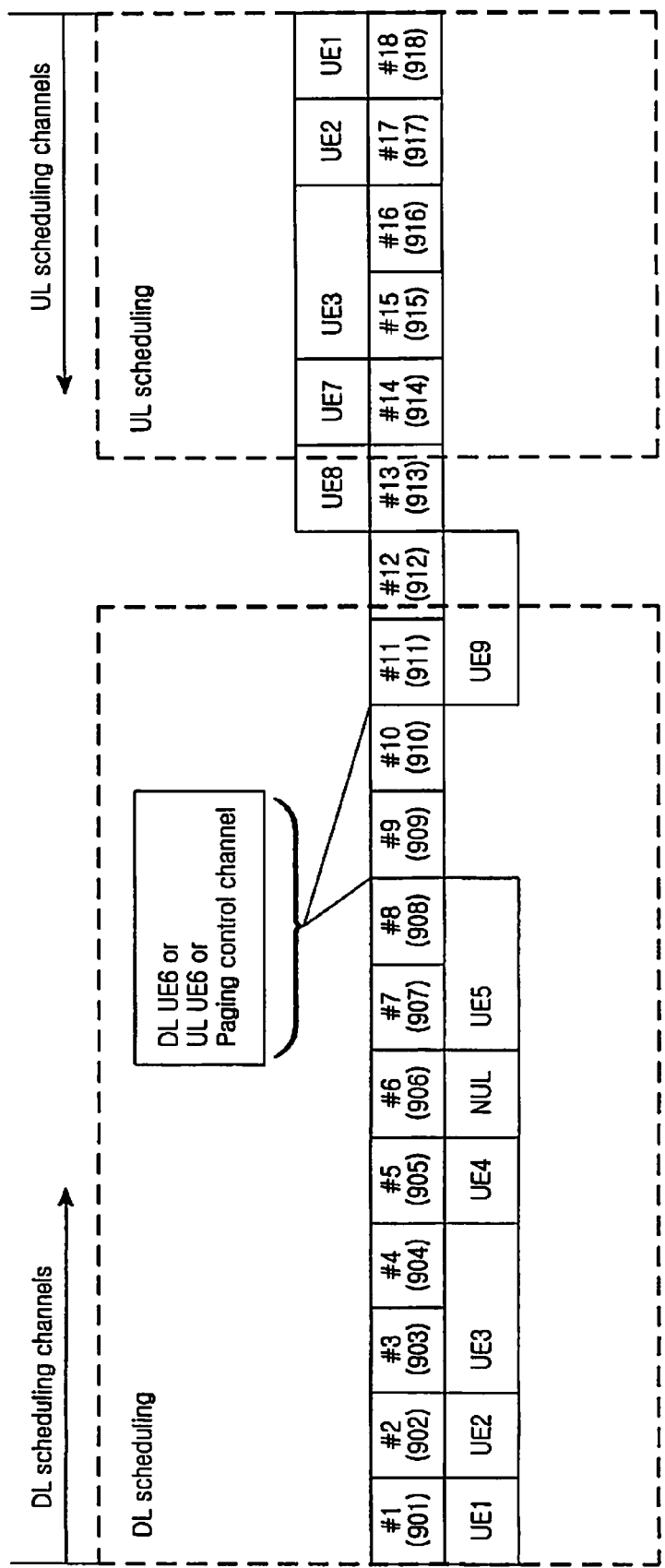
FIG. 9 is example 1 for eNodeB transmitting paging control channel with pre-allocated resources.

With reference with FIG. 9, #1, #2, . . . , #18 (901, 902, . . . , 918) denote the fundamental control channel RBs in logic and a control channel in logic may consist of such one fundamental control channel RB or more. Except the control channel RBs 909 and 910, RBs 901, 902, . . . , 912 are used for the transmission of downlink scheduling channels. RBs 913, 914, . . . , 918 (RBs numbered from #13 to #18) are used for the transmission of uplink scheduling channels. The control channel RBs 909 and 910 are used by eNodeB to transmit paging control channels. Here, please be noted that in the former three embodiments of present invention, it is supposed that the number (which is configured semi-statically by the system) of logic RBs occupied by the uplink scheduling channels equal the number of logic RBs occupied by the downlink scheduling channels.

Since it is not necessary to transmit downlink paging information at all time, i.e., it is not necessary for eNodeB to transmit paging control channel to UE in every TTI, uplink or downlink scheduling channel information can be transmitted through these prescribed locations (909 and 910) when there is no downlink paging information to be transmitted.

A second embodiment

In this embodiment, eNodeB transmits the paging control channel via the pre-allocated physical resource locations according to the prescribed rules.

The rule in this embodiment is applied to specify the logic number (the continuous fundamental control channel physical RBs in logic may be discontinuous in physical. Here, the fundamental physical channel resource consists of a group of OFDM sub-carriers.) for all fundamental physical channel resources that can transmit control channels (the control channels here refer to the whole of the downlink scheduling channels, the uplink scheduling channels and the paging control channels) in the successive order.

In this embodiment, the prescribed rules and operations performed by eNodeB and UE are just the same as that in the first embodiment. The difference lies in that the number of uplink scheduling and downlink scheduling control channels in this embodiment is variable dynamically. In this system, the total number of control channels can be configured dynamically, and the ratio between the number of the downlink scheduling channels and that of the uplink scheduling channels can be configured semi-statically so as to save the control signaling. But, in each TTI, the number of the uplink and downlink scheduling control channels varies with the total number of the control channels.

Figure 10:
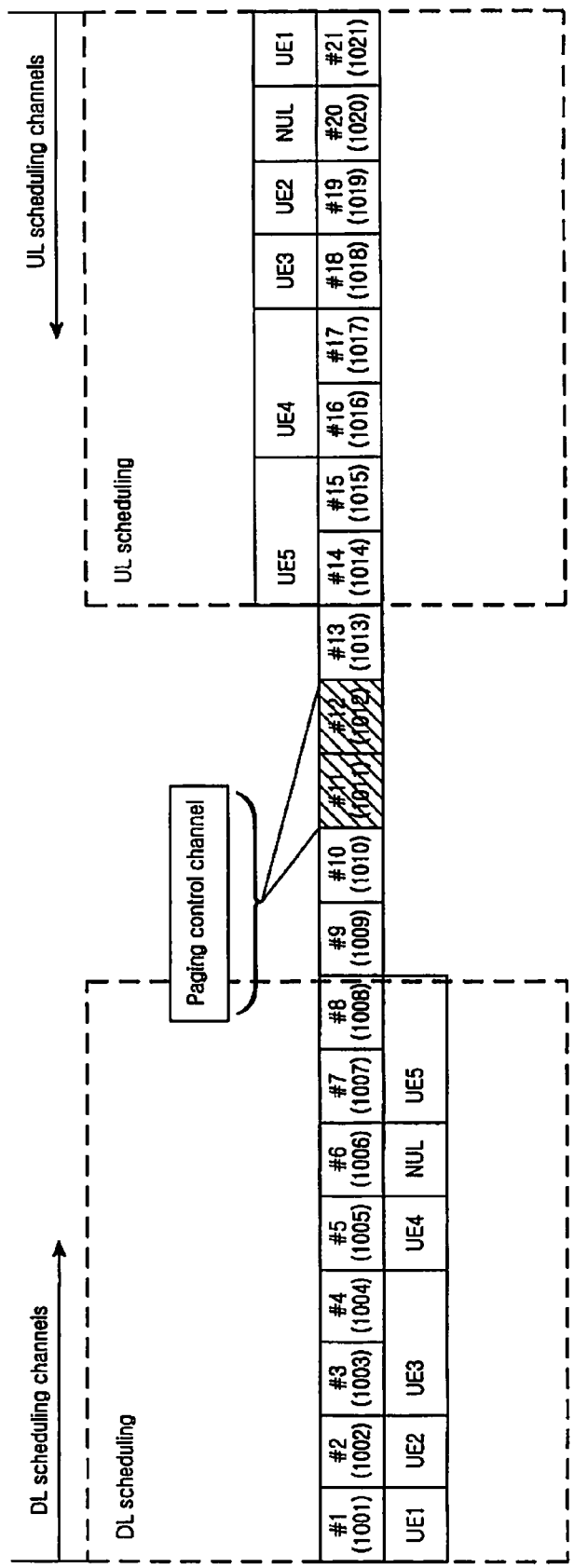
FIG. 10 is example 2 for eNodeB transmitting paging control channel with pre-allocated resources.

With reference to FIG. 10, elements 1001, 1002, . . . , 1021 (numbered as #1, #2, . . . , #21) denote the fundamental control channel RBs in logic and a control channel in logic may consist of such one fundamental control channel physical RB or more, and a one-to-one mapping relationship exists between each fundamental control channel RB in logic and the physical RB. Fundamental control channel RBs 1001, 1002, . . . , 1008 are used for the transmission of downlink scheduling channels. RBs 1014, 1015, . . . , 1021 (RBs numbered from #14 to #21) are used for the transmission of uplink scheduling channels. The control channel RBs 1011 and 1012 are used by eNodeB to transmit paging control channels. 1009, 1010 and 1013 are not in service. 1009 and 1010 can be used for the transmission of downlink scheduling channels, and 1013 can be used for the transmission of uplink scheduling channels.

A third embodiment

In this embodiment, eNodeB transmits paging control channel to the UE via the pre-allocated physical resource locations according to the prescribed rules.

In this embodiment, the prescribed rules and operations performed by eNodeB and UE are just the same as that in embodiment one. The difference lies in that: in this embodiment, the logic number of fundamental control channels for the transmission of paging control channels starts from the one next to the logic number that downlink scheduling channel stops, but in the first embodiment, the position is still used to transmit the downlink scheduling control channel.

Figure 11:
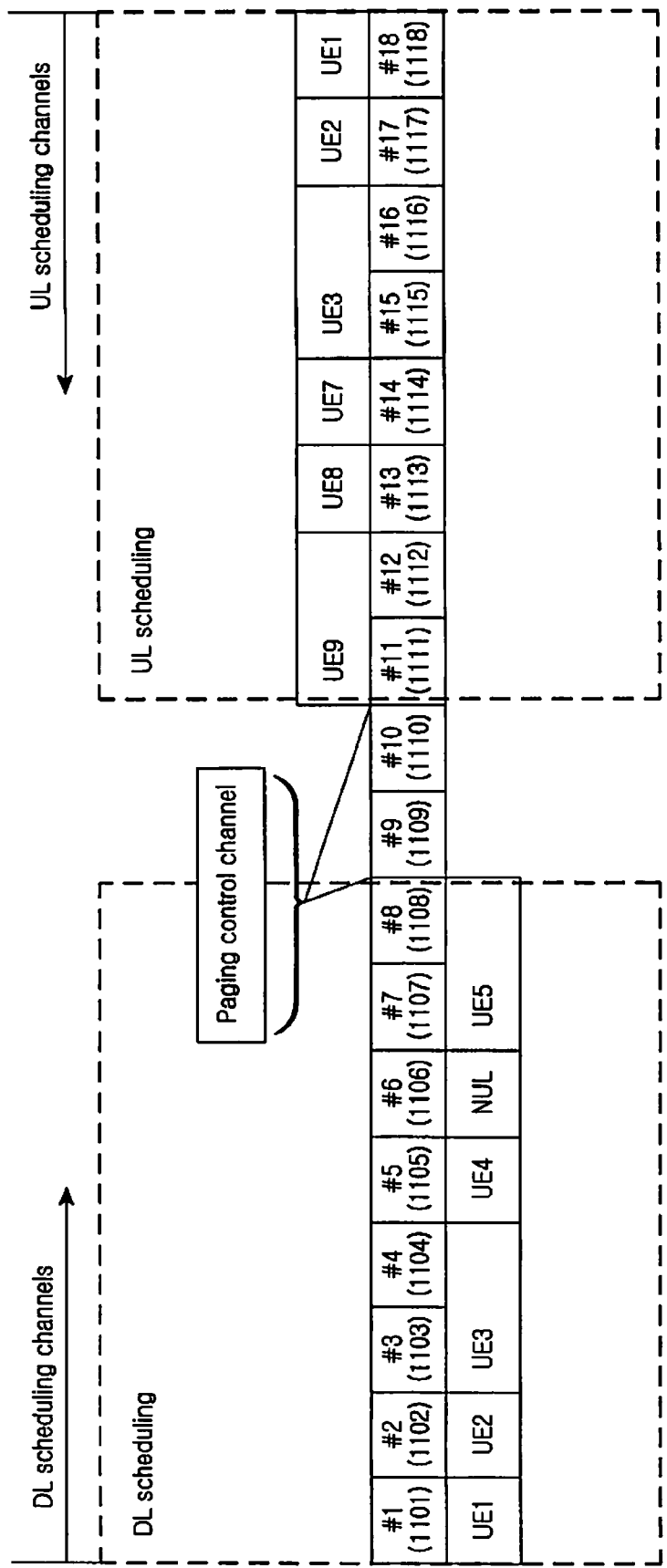
FIG. 11 is example 3 for eNodeB transmitting paging control channel with pre-allocated resources.
Figure 12:
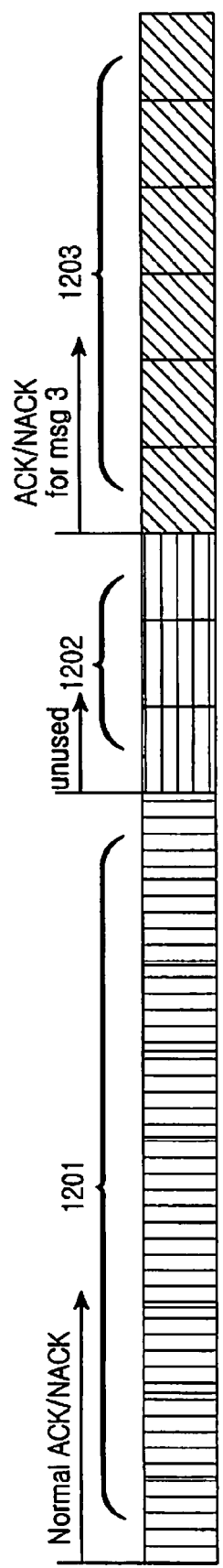
FIG. 12 is example 1 for eNodeB transmitting RACH Message 3 ACK/NACK channel with pre-allocated resources.
Figure 13:
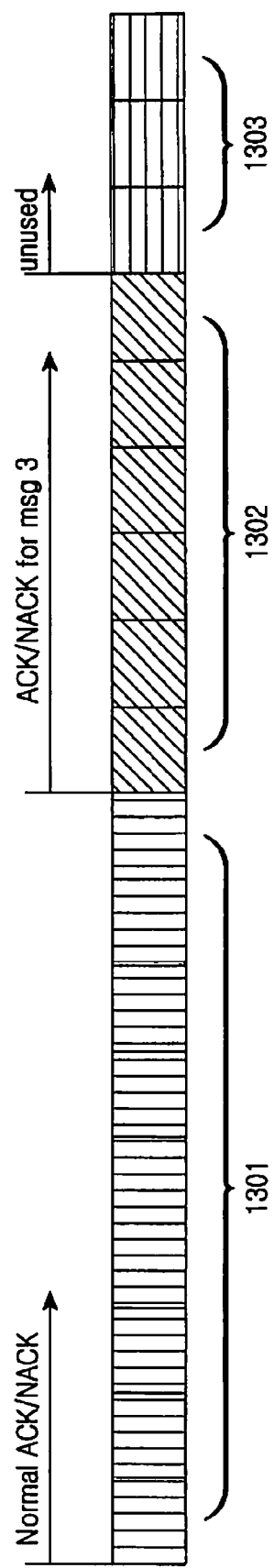
FIG. 13 is example 2 for eNodeB transmitting RACH Message 3 ACK/NACK channel with pre-allocated resources.
Figure 14:
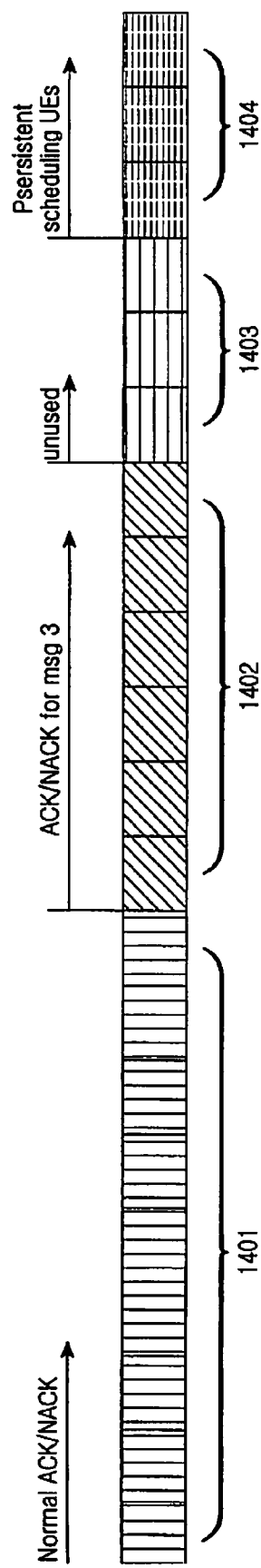
FIG. 14 is example 3 for eNodeB transmitting RACH Message 3 ACK/NACK channel with pre-allocated resources.

With reference to FIG. 11, elements 1101, 1102, . . . , 1118 (numbered as #1, #2, . . . , #18) denote the fundamental control channel RBs in logic. And a control channel in logic can consist of such one fundamental control channel physical RB or more, and a one-to-one mapping relationship exists between each fundamental control channel RB in logic and the physical RB. Fundamental control channel RBs 1101, 1102, . . . , 1108 are used for the transmission of downlink scheduling channels. RBs 1111, 1112, . . . , 1118 (RBs numbered from #11 to #18) are used for the transmission of uplink scheduling channels. The control channel RBs 1109 and 1110 are used by eNodeB to transmit paging control channels.

The fourth embodiment

In this embodiment, eNodeB transmits RACH message 3 ACK/NACK channel to UE via the pre-allocated physical resource locations according to the prescribed rules.

In an LTE system, according to present discussion, the system preserves physical resources (in the downlink physical resources) for downlink ACK/NACK channels. Here, the physical resources can be either time, frequency or both. The downlink ACK/NACK channels in LTE include the ones for HARQ transmission of uplink data, the ones for HAQR transmission of RACH Message 3, and the ones for HARQ transmission of Persistent scheduled UE's data potentially.

The rule in this embodiment is applied to specify the logic number for the fundamental physical channel resources preserved for the transmission of all ACK/NACK control channels. For the transmission of the HARQ ACK/NACK information of the uplink common data, the order is arranged from the beginning to the end; and for the transmission of the HARQ ACK/NACK information of RACH message 3, the order is arranged from the end to the beginning. Since RACH message 2 may possibly contain several UEs' response messages, in this case, during the process that message 3 ACK/NACK is transmitted in the order from the end to the beginning in logic number, ACK/NACK's transmission order of different UEs is just the same as that of different UEs' response messages in message 2.

The operation performed by eNodeB as follows: it determines whether it is necessary to transmit the RACH message 3 ACK/NACK information to some UE within the cells of eNodeB through a slot (used to transmit control information) in some TTIs according to its needs. If yes, eNodeB selects the logic number that satisfies the requirements for the transmission of RACH message 3 ACK/NACK channel according to the prescribed rules. Then, it finds out the physical resources' detailed positions in TTI according to the corresponding relationship between the logic number and the physical resource and then transmits RACH message 3 ACK/NACK information via the found positions. Since RACH message 2 may possibly contain several UEs' response messages, in this case, during the process that message 3 ACK/NACK is transmitted in the order from the end to the beginning in logic number, ACK/NACK's transmission order of different UEs is just the same as that of different UEs' response messages in message 2.

The operation performed by the as follows: the UE receives information from eNodeB via the pre-allocated slots after it transmits RACH message 3. Then, the UE obtains the logic number for the transmission of RACH message 3 ACK/NACK channel according to the prescribed rules. Now, the UE finds out the physical resources' detailed positions in TTI according to the corresponding relationship between the logic number and the physical resource and then receives RACH message 3 ACK/NACK information via the found positions. Then the UE reads its own ACK/NACK information according to the order from the end to the beginning. When the RACH message 2 contains several response messages of UEs, the order in which different UEs read out ACK/NACK information from RACH message 3 is just the same as that of different UEs' response messages in message 2.

With reference to FIG. 12, 1201, 1202 and 1203 denote the ACK/NACK channel resources in logic. The logic number of ACK/NACK channel group for common uplink data is 1201, the logic number of uplink random access message 3 ACK/NACK is 1203 and the unused logic numbered channel resource group is 1202.

A fifth embodiment

In this embodiment, eNodeB transmits the RACH message 3 ACK/NACK channel to the UE via the pre-allocated physical resource locations according to the prescribed rules.

The rule in this embodiment is applied by eNodeB to specify the logic number for all ACK/NACK fundamental control physical channel RBs in the order from the beginning to the end according to the preserved physical resources. For the transmission of the HARQ ACK/NACK information of the uplink common data, the order is arranged from the beginning to the end; and for the transmission of the HARQ ACK/NACK information of RACH message 3, the order is arranged from the control channel logic number next to the last one used to transmit common data ACK/NACK information. Since RACH message 2 may possibly contain several UEs' response messages, in this case, during the process that message 3 ACK/NACK is transmitted in the order from the end to the beginning in logic number, ACK/NACK's transmission order of different UEs is just the same as that of different UEs' response messages in message 2.

Except the rule applied in this example is different from that in example four, the operations that eNodeB and the UE performs in this example are kept just the same as that in example four.

With reference to FIG. 13, 1301, 1302 and 1303 denote the ACK/NACK channel resources in logic. The logic number of ACK/NACK channel group for common uplink data is 1301; the logic number of uplink random access message 3 ACK/NACK is 1303, unused logic numbered channel resource group is 1302.

A sixth embodiment

In this embodiment, eNodeB transmits the RACH message 3 ACK/NACK channel to the UE via the pre-allocated physical resource locations according to the prescribed rules.

The prescribed rules in this embodiment is just the same as that in the fifth embodiment, i.e., the prescribed rule is applied by eNodeB to specify the logic number for all ACK/NACK fundamental control physical channel RBs in the order from the beginning to the end according to the preserved physical resources. For the transmission of the HARQ ACK/NACK information of the uplink common data, the order is arranged from the beginning to the end; and for the transmission of the HARQ ACK/NACK information of RACH message 3, the order is arranged from the control channel logic number next to the last one used to transmit common data ACK/NACK information. Since RACH message 2 may possibly contain several response messages of UEs, in this case, during the process that message 3 ACK/NACK is transmitted in the order from the end to the beginning in logic number, the ACK/NACK's transmission order of different UEs is just the same as that of different UEs' response messages in message 2; for the transmission of HARQ ACK/NACK information of Persistent scheduled UE's data, the order is arranged from the end to the beginning.

In this embodiment, operations that eNodeB and UE perform are just the same as that in the fifth embodiment.

The point that this embodiment differs from the fifth embodiment lies in that: of all the physical resources preserved for the transmission of downlink ACK/NACK information, some are applied for transmitting HARQ ACK/NACK information for Persistent scheduled UE data.

With reference to FIG. 14, 1401, 1402, 1403 and 1404 denote the ACK/NACK channel resources in logic: the logic number of ACK/NACK channel group for common uplink data is 1401; the logic number of uplink random access message 3 ACK/NACK is 1402, the unused logic numbered channel resource group is 1403, and the logic number group of the HARQ ACK/NACK channel resources for Persistent scheduled UE data is 1404.

A seventh embodiment

In this embodiment, eNodeB transmits the downlink and the uplink scheduling channels to the UE via the pre-allocated physical resource locations according to the prescribed rules.

In an LTE system, eNodeB transmits the downlink and the uplink scheduling information to the UE. The downlink scheduling channel is used to allocate the physical resources for the UE to transmit the downlink data and inform the UE of such information as the transmission format, MIMO parameters and HARQ information. The uplink scheduling channel is used to allocate the physical resources for the UE to transmit the uplink data and inform the UE of information such as the transmission format, MIMO parameters and so on.

In this embodiment, the prescribed rules are applied by eNodeB to specify the logic number for all fundamental control channel physical RBs for downlink and uplink scheduling channels. Thus: (1) eNodeB transmits downlink scheduling channels to (B-type UE) in order from the beginning to the end; (2) eNodeB transmits uplink channels to (C-type UE) in order from the end to the beginning; (3) If there exists any UE (A-type UE) requiring both the uplink and downlink scheduling channels, eNodeB transmits the downlink scheduling channel to the UE in the order from the beginning to the end, and then transmits the uplink scheduling channel to it in the order from the end to the beginning. There is a corresponding relationship between the logic number of the uplink scheduling channel and that of the downlink scheduling channel of A-type UE.

The operation performed by eNodeB as follows: it determines whether it is necessary to transmit scheduling control information to some UE within the cells of eNodeB through a transmission slot in some TTIs according to its needs; If yes, eNodeB selects the channel with the logic number that satisfies the requirements for the transmission of scheduling control channel according to the prescribed rules; Then, the eNodeB finds out the physical resources' detailed positions in TTI according to the corresponding relationship between the logic number and the physical resource and then transmits scheduling control information via the found positions.

The operation performed by the UE as follows: the UE receives information from eNodeB via the receiving slots in TTI. Then, it obtains the logic number of the channels for the transmission of scheduling channels according to the prescribed rules. Now, the UE finds out detailed positions in TTI of the physical resources according to the corresponding relationship between the logic number and the physical resource and then receives scheduling control information via the found positions.

Figure 15:
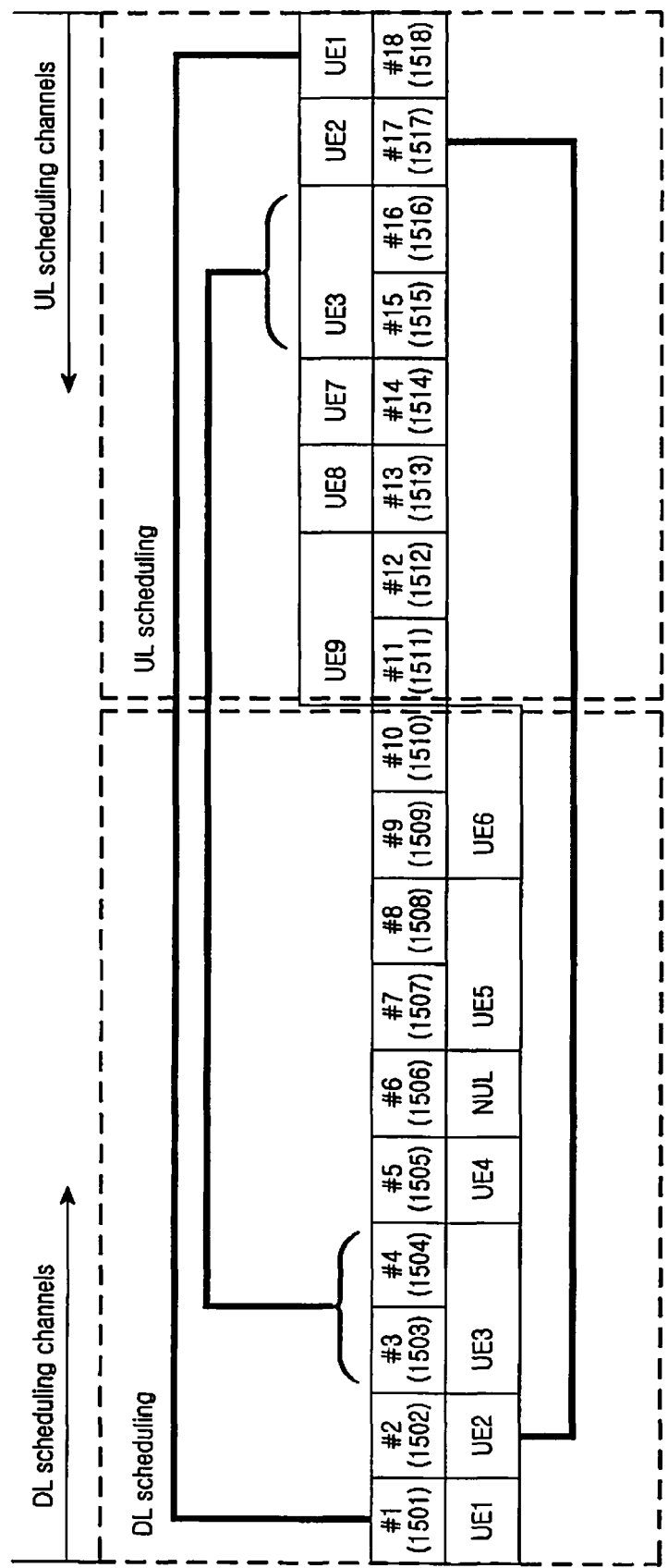
FIG. 15 is example 1 for eNodeB transmitting uplink/downlink scheduling channel with pre-allocated resources.

With reference to FIG. 15, 1501, 1502, ..., 1510 are used to transmit the downlink scheduling information; 1511, 1512, ..., 1518 are used to transmit the uplink scheduling information; 1511, 1512, 1513 and 1514 are used to transmit the scheduling information to the UEs that need only the downlink scheduling information; 1501, 1502, 1503, 1504, 1515, 1516, 1517 and 1518 are used to transmit the scheduling information to the UEs that need both uplink and downlink scheduling information, where 1501, 1502, 1503 and 1504 are used to transmit the downlink scheduling information, and 1515, 1516, 1517 and 1518 are used to transmit the uplink scheduling information.

An eighth embodiment

In this embodiment, eNodeB transmits the downlink and the uplink scheduling channels to UE via the pre-allocated physical resource locations according to the prescribed rules.

In this embodiment, the prescribed rules are applied by eNodeB to specify logic number for all fundamental control channel physical RBs for the downlink and the uplink scheduling channels. Then: (a) eNodeB transmits the downlink and the uplink scheduling information to one of A-type UE (A-type UE refers to the one that needs to transmit downlink scheduling information and uplink scheduling information within one TTI) in the order from the beginning to the end. Similarly, eNodeB finishes transmitting the downlink and uplink scheduling channels information to all A-type UEs; (b) From the channel with the resource logic number next to the last one used in step (a) on, eNodeB transmits the downlink scheduling channels to all B-type UEs that need only downlink scheduling information; (c) From the channel with the resource logic number next to the last one used in step (b), eNodeB transmits the uplink scheduling channels to all C-type UEs that need only the uplink scheduling information.

Except the rule applied in this example is different from that in the seventh embodiment, the operations that eNodeB and the UE performs in this example are kept just the same as that in the seventh embodiment.

Figure 16:
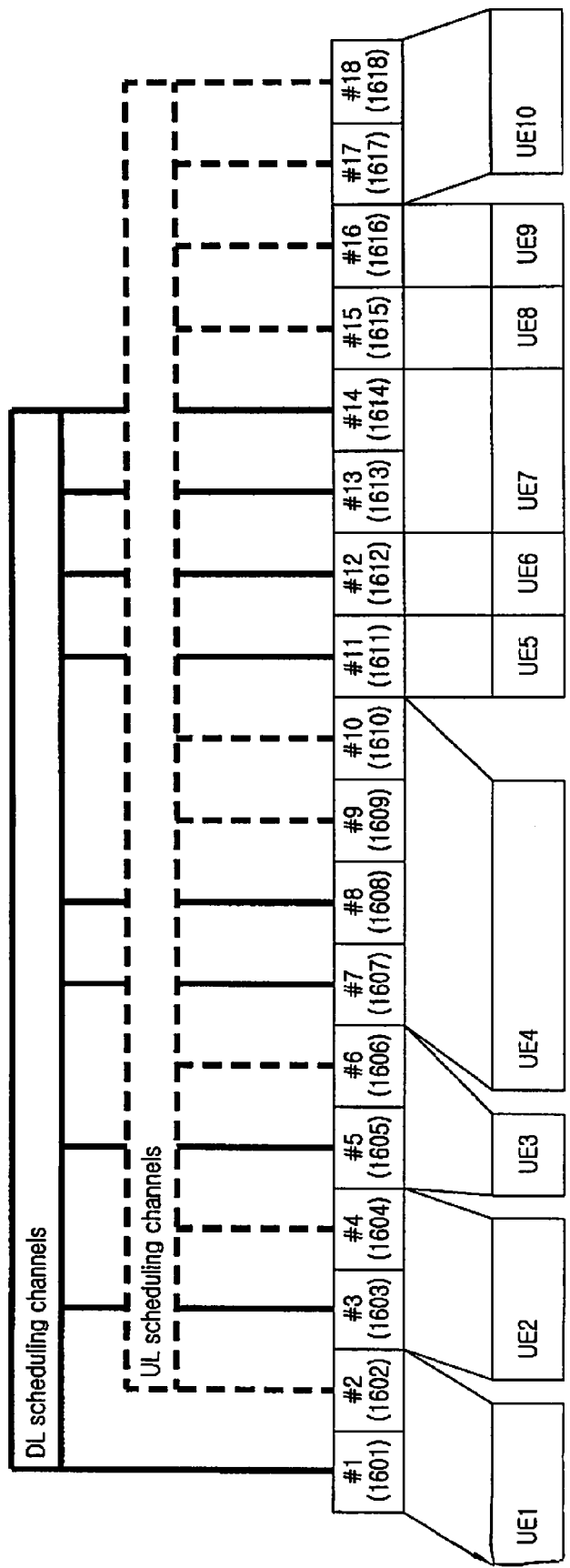
FIG. 16 is example 2 for eNodeB transmitting uplink/downlink scheduling channel with pre-allocated resources.
Figures 17, 18:
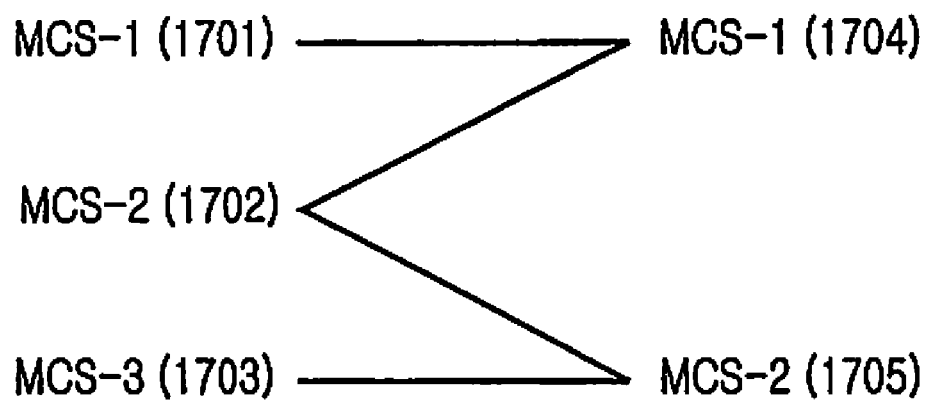
FIG. 17 is a mapping relationship between a MCS of a downlink scheduling channel and that of an uplink scheduling channel.
FIG. 18 is a MCS level indicating format in a case that a corresponding mapping relationship exists between a MCS of an uplink scheduling channel and that of a downlink scheduling channel.

With reference to FIG. 16, 1601, 1602, ..., 1610 are used to transmit scheduling information to UEs that need both downlink and uplink scheduling information, where 1601, 1603, 1605, 1607 and 1608 are used to transmit downlink scheduling information and 1602, 1604, 1606, 1609 and 1610 are used to transmit uplink scheduling information; 1611, 1612, 1613 and 1614 are used to transmit scheduling information to UEs that need only downlink scheduling information; 1615, 1616, 1617 and 1618 are used to transmit scheduling information to UEs that need only uplink scheduling information.

A ninth embodiment

In this embodiment, the prescribed rule is that a corresponding mapping relationship is established between the level of MCS applied in the downlink scheduling channels and that applied in the uplink scheduling channels.

Please refer to FIG. 17, 1701, 1702 and 1703 denote the levels of MCS applied in the downlink scheduling channels, i.e., MCS-1, MCS-2 and MCS-3. 1704 and 1705 denote the levels of MCS applied in the uplink scheduling channels, i.e., MCS-1 and MCS-2. The applied corresponding mapping rule is that: 1701 corresponds to 1704, 1703 corresponds to 1705, and 1702 corresponds to 1704 and 1705 (one-to-two mapping relationship).

With this mapping relationship, when the system semi-statically configures the level of MCS for downlink scheduling channels and uplink scheduling channels, it can use the method that configures absolute MCS levels for uplink scheduling channels and relative ones for downlink scheduling channels to complete the configurations. Please refer to FIG. 18, 1801 denotes the UL bit of the absolutely configured MCS for the uplink scheduling channel, 1802 denotes the DL bit of the relatively configured MCS for the downlink scheduling channel. Here, the MCS levels of the downlink scheduling channels are configured relative to the MCS levels of the uplink scheduling channels according to the corresponding relationship. With this configuration method, signaling can be reduced over the method that configures the MCS levels for both downlink and uplink scheduling channels absolutely.

Figure 19:
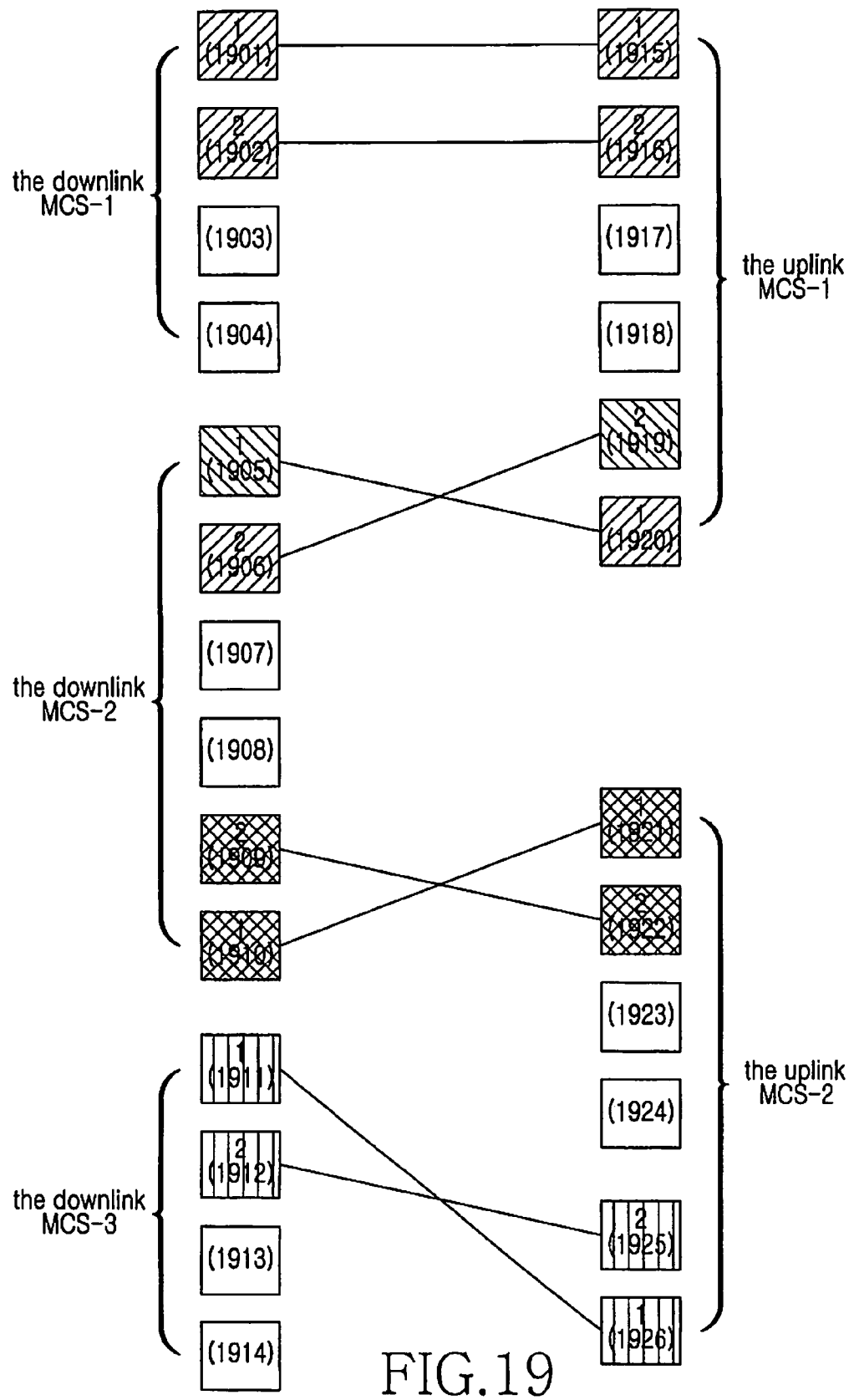
FIG. 19 is a mapping relationship between a MCS of the downlink scheduling channel and that of a uplink scheduling channel, and the order for information transmission.

FIG. 19 illustrates rules on specifying the logic number for the fundamental control channel RBs that are used by eNodeB to transmit downlink and uplink scheduling channels after the corresponding mapping relationship between MCS levels is used to determine the MCS level. For A-type UE that needs to transmit uplink and downlink scheduling channels, if MCS-1 is applied in downlink scheduling, then according to the mapping rule, this kind of UE should applied MCS-1 in uplink scheduling channels. The logic numbers of UE's all downlink control channels starts from the starting point of all downlink control channels with MCS-1 1901, and information is transmitted sequentially to all A-type UEs' downlink scheduling channels (1902, 1903, 1904). For the uplink scheduling channels of such UE, eNodeB can sequentially transmits uplink scheduling information to all A-type UEs (1916, 1917, 1918) via the control channels with the logic number starting from ones that uplink scheduling channels occupy 1915. If MCS-2 is applied in downlink scheduling channels and MCS-1 is applied uplink scheduling channels, the logic numbers of UE's all downlink control channels starts from the starting point of all downlink control channels with MCS-2 1905, and information is transmitted sequentially to all A-type UEs' downlink scheduling channels (1906, ... ). For the uplink scheduling channels of such UE, eNodeB can sequentially transmits uplink scheduling information to all A-type UEs (1920, 1919, ... ) via the control channels with the logic number starting from ones that uplink scheduling channels with MCS-1 occupy. If MCS-2 is applied in downlink scheduling channels and MCS-2 is applied in uplink scheduling channels, the logic numbers of UE's all downlink control channels starts from the end point of all downlink control channels with MCS-2 1910, and information is transmitted sequentially to all A-type UEs' downlink scheduling channels (1909, ... ). For the uplink scheduling channels of such UE, eNodeB can sequentially transmits uplink scheduling information to all A-type UEs (1921, 1922, . . . ) via the control channels with the logic number starting from ones that uplink scheduling channels with MCS-2 occupy. If MCS-3 is applied in downlink scheduling, then according to the mapping rule, this kind of UE should applied MCS-2 in uplink scheduling channels. The logic numbers of UE's all downlink control channels starts from the starting point of all downlink control channels with MCS-3 1911, and information is transmitted sequentially to all A-type UEs' downlink scheduling channels (1912, . . . ). For the uplink scheduling channels of such UE, eNodeB can sequentially (from backward to forward) transmits uplink scheduling information to all A-type UEs (1926, 1925, . . . ) via the control channels with the logic number starting from the end ones that uplink scheduling channels occupy.

The UE that needs to transmit only downlink or uplink scheduling channels is called B-type or C-type UE. For B-type UE, if MCS-1 is applied, the downlink scheduling channels are transmitted through the locations 1903 and 1904 shown in FIG. 19 (all B-type UEs's downlink MCS-1 scheduling channels are logically numbered next to the ones that all A-type UEs' downlink scheduling channels are finished transmission, and the sequence order is from front to back); If MCS-2 is applied, the downlink scheduling channels are transmitted through the locations 1907 and 1908 shown in FIG. 19 (all B-type UEs's downlink MCS-2 scheduling channels are logically numbered next to the ones that all A-type UEs' downlink scheduling channels are finished transmission, and the sequence order is from median to two ends); If MCS-3 is applied, the downlink scheduling channels are transmitted through the locations 1913 and 1914 shown in FIG. 19 (all B-type UEs's downlink MCS-3 scheduling channels are logically numbered next to the ones that all A-type UEs' downlink scheduling channels are finished transmission, and the sequence order is from front to back).

For C-type UE, if MCS-1 is applied, the uplink scheduling channels are transmitted through the locations 1917 and 1918 shown in FIG. 19 (all C-type UEs's uplink MCS-1 scheduling channels are logically numbered next to the ones that all A-type UEs' uplink scheduling channels are finished transmission, and the sequence order is from median to the two ends); if MCS-2 is applied, the uplink scheduling channels are transmitted through the locations 1923 and 1924 shown in FIG. 19 (all C-type UEs's uplink MCS-2 scheduling channels are logically numbered next to the ones that all A-type UEs' uplink scheduling channels are finished transmission, and the sequence order is from median to the two ends).

Figure 20:
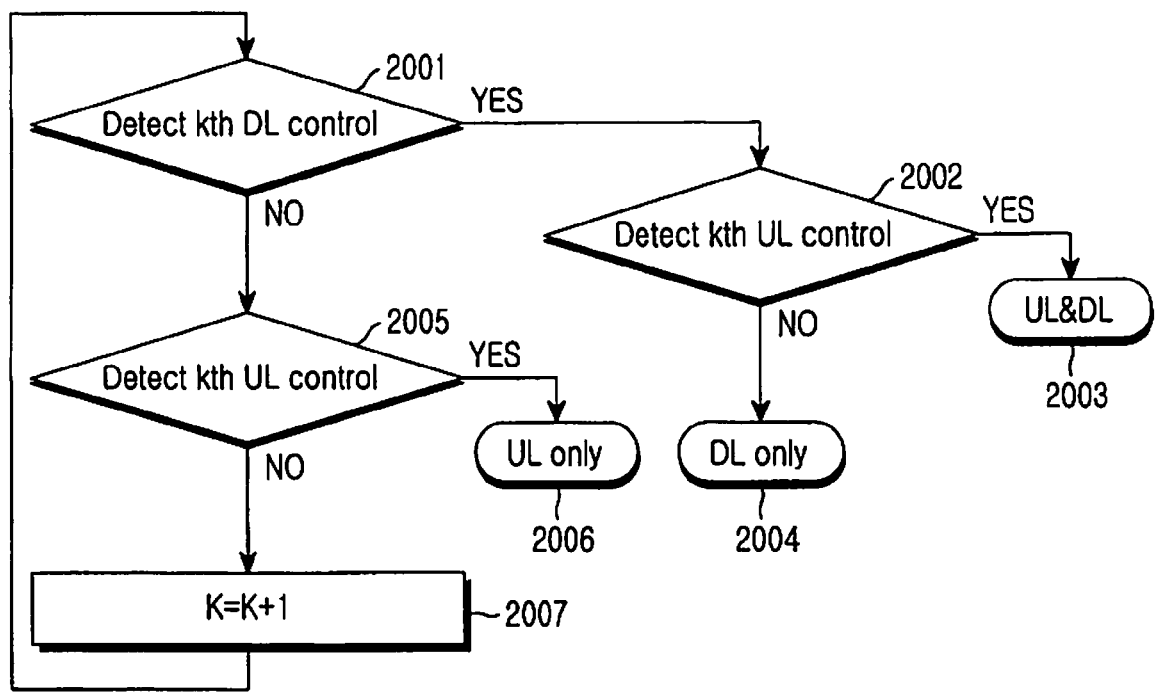
FIG. 20 is a process flow for UE receiving a scheduling channel.

FIG. 20 illustrates a flow that that UE receives scheduling channels after the application of corresponding mapping relationship (the mapping between the downlink MCS and the uplink MCS): k in the figure denotes the $k^{th}$ detection to the scheduling channel. UE operates in module 2001 to detect whether there is any downlink scheduling channel or not. With module 2005, it can be detected whether there is any uplink scheduling channel. With module 2002 and according to the rule on location, it can be detected whether there is any uplink scheduling channel or not when there exists downlink scheduling channels; In module 2003, 2004 and 2006, determination can be made according to the detecting result and then the detecting process completes; 2007 denotes that the detecting process does not be completed but continues to detect next possible scheduling channel location.

A tenth embodiment

This is another embodiment describing on obtaining message 3 ACK/NACK channel during the random access process.

Figure 21:
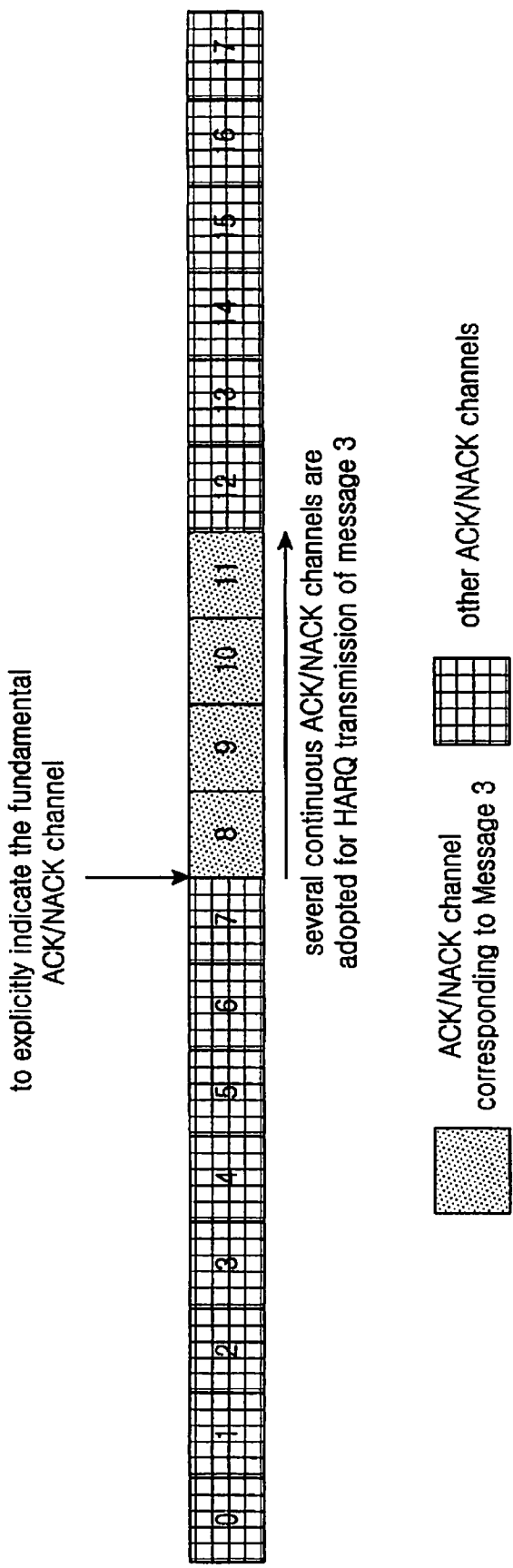
FIG. 21 is example 4 for indicating an ACK/NACK channel corresponding to RACH Message 3.

As shown in FIG. 21, the index (i.e., index 8) of the fundamental ACK/NACK channel transmitted in the downlink is first indicated. This index can be transmitted through either the PDCCH (which is the downlink resource allocated for message 2) or PDSCH allocated for message 2. Then, according to the orders of the preambles' response messages in message 2, the ACK/NACK channels corresponding to the preambles are obtained in ascend order starting from the fundamental ACK/NACK channel. In FIG. 21, suppose that message 2 contains four preambles' response messages, then the indices of the corresponding message 3 ACK/NACK channels are 8, 9, 10 and 11 in turn.

An eleventh embodiment

This is another embodiment describing on obtaining message 3 ACK/NACK channel during the random access process.

Figure 22:
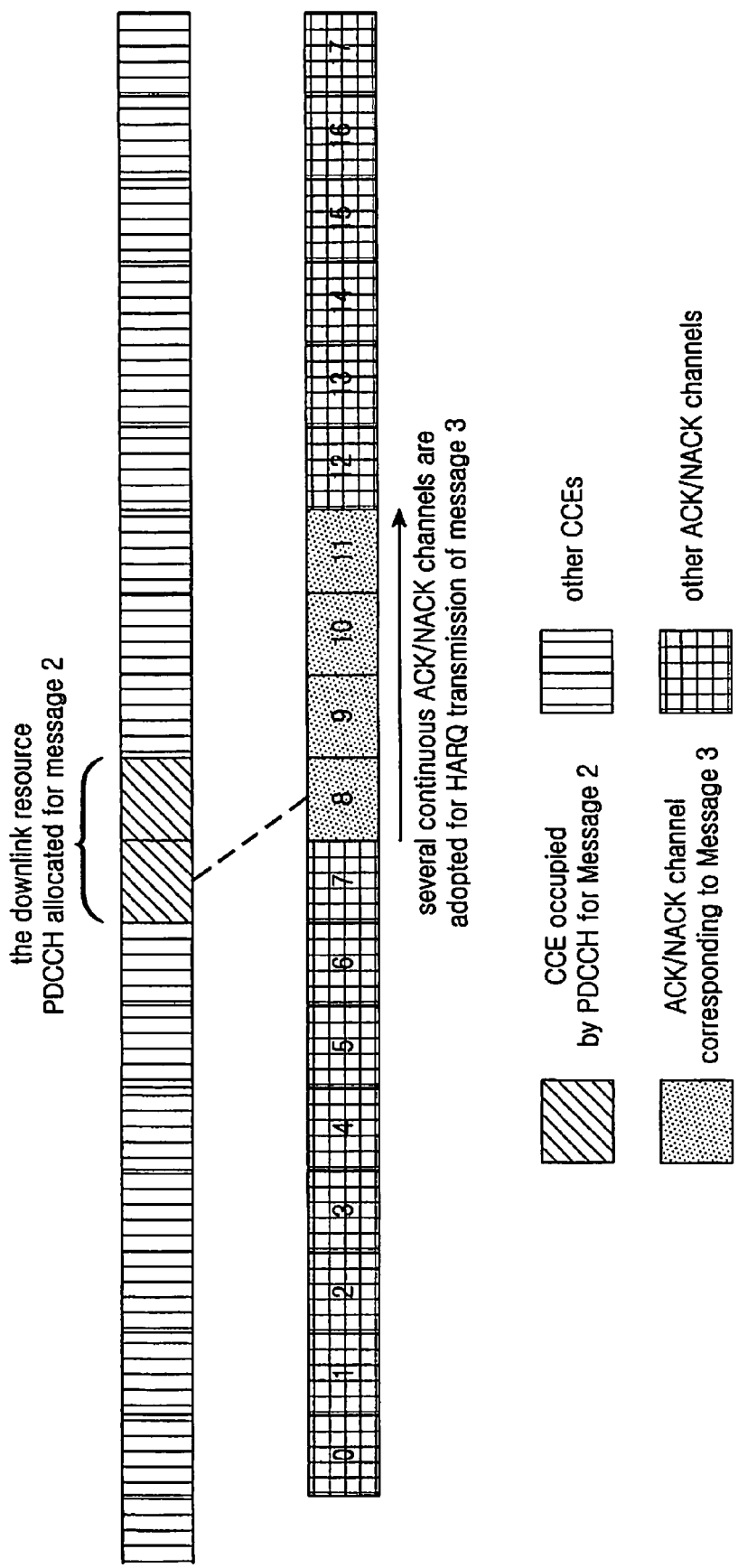
FIG. 22 is example 5 for indicating an ACK/NACK channel corresponding to RACH Message 3.

As shown in FIG. 22, according to the index of the CCE occupied by PDCCH allocated for message 2, the index (i.e., index 8) of a fundamental ACK/NACK channel transmitted in the downlink can be implicitly obtained. In FIG. 22, suppose the downlink resource PDCCH allocated for message 2 consists of two CCEs, and the index of the fundamental ACK/NACK channel can be implicitly obtained according to the index of the first CCE. Then, according to the order in which the preambles' response messages are arranged in message 2, the ACK/NACK channels corresponding to the preambles can be obtained in ascend order starting from the fundamental ACK/NACK channel. In FIG. 21, it is supposed that message 2 contains four preambles' response messages, then the indices of the corresponding message 3 ACK/NACK channels are 8, 9, 10 and 11 in turn.

What is claimed is:

1. A method for an eNodeB transmitting paging control channels with pre-allocated resources comprising steps of:
   a) the eNodeB determining whether to transmit a paging control signaling according to its needs, and
   b) the eNodeB transmitting the paging control signaling with pre-allocated resources, by specifying median positions of all downlink L1/L2 control channels as the position to transmit paging control channels, and performing, if the median is not an integer, a rounding process to obtain an integer as the position for the transmission of paging control channel, the rounding process being prescribed and only one process being chosen in a subsequent process.

2. The method according to claim 1, wherein step b) further comprising steps of specifying locations of Xp=Nt*Nd/(Nd+Nu) in all downlink L1/L2 control channels as positions for the transmission of paging control channels, where Nt: the total number of downlink L1/L2 control channels,
   Nd: the number of downlink scheduling control channels in the downlink L1/L2 control channels,
   Nu: the number of uplink scheduling control channels in the downlink L1/L2 control channels,
   and Nt, Nu and Nd are configured dynamically, statically or semi-statically; if Xp is not an integer, a rounding process is performed to obtain an integer as the position for the transmission of paging control channel, and the rounding process is prescribed and only one process should be chosen in subsequent process.

3. A method for an eNodeB transmitting a message 3 ACK/NACK signaling with pre-allocated resources comprising steps of:
   a) the eNodeB determining whether to transmit a uplink access message 3 ACK/NACK signaling according to its needs, and b) the eNodeB transmitting the uplink access message 3 ACK/NACK signaling with the pre-allocated resources, wherein the eNodeB explicitly allocates different physical resources for message 3 ACK/NACK channels of each UE.

4. The method according to claim 3, wherein if a logic number of common data ACK/NACK channels starts from a beginning to an end, the eNodeB selects logic numbers for message 3 ACK/NACK channels according to a logic number of control channels from an end to a beginning, and transmits RACH message 3 ACK/NACK information via corresponding physical resource locations.

5. The method according to claim 3, wherein if a logic number of common data ACK/NACK channels starts from a beginning to an end, the eNodeB selects logic numbers for message 3 ACK/NACK channels according to a logic number of control channels from the next one to the ACK/NACK channel that a last common data occupies, and transmits RACH message 3 ACK/NACK information via corresponding physical resource locations.

6. A method for an eNodeB transmitting downlink scheduling channels with pre-allocated resources comprising steps of:
   a) the eNodeB determining whether to transmitting a downlink scheduling signaling according to its needs, and
   b) the eNodeB transmitting the downlink scheduling signaling with the pre-allocated resources
   wherein for a UE referred to as an A-type UE that simultaneously needs an uplink scheduling channel and the downlink scheduling channel, a mapping relationship is specified between locations of the downlink scheduling channel and the uplink scheduling channel.

7. A method for an eNodeB transmitting a uplink scheduling signaling with pre-allocated resources comprising steps of:
   a) the eNodeB determining whether to transmit the uplink scheduling signaling according to its needs, and
   b) the eNodeB transmitting the uplink scheduling signaling with the pre-allocated resources,
   wherein for a UE referred as A-type UE that simultaneously needs the uplink scheduling channel and downlink scheduling channel, a mapping relationship is specified between locations of the downlink scheduling channel and the uplink scheduling channel when the uplink and downlink scheduling channels bear several levels of a Modulation and Coding Scheme (MCS).

8. The method according to claim 7, wherein an order of transmission locations is specified on scheduling a channel for the A-type UE that simultaneously needs the uplink scheduling channel and downlink scheduling channel, for a B-type UE that needs only the downlink scheduling channel and for a C-type UE that needs only the uplink scheduling channel.

9. A device for an eNodeB transmitting control signaling with pre-allocated resources comprising a transmitting/receiving means and further comprising:
   a) a control signaling generator, for the eNodeB determining whether to transmit the control signaling;
   b) a physical channel multiplexer, for multiplexing the control signaling together with downlink user data to form a physical channel;
   c) a control signaling transmission module, for the eNodeB transmitting the control signaling with pre-allocated resources according to properties of the control signaling that needs to be transmitted; and
   d) a physical channel de-multiplexer for de-multiplexing uplink user data and uplink control channels,
   wherein for a UE referred to as an A-type UE that simultaneously needs the uplink scheduling channel and the downlink scheduling channel, a mapping relationship is specified between locations of the downlink scheduling channel and the uplink scheduling channel.

10. A device for a UE receiving a control signaling transmitted from an eNodeB via pre-allocated resources comprising a transmitting/receiving means and further comprising:
    a) a control signaling receiving module, for the UE receiving the control signaling at a prescribed resource location;
    b) a physical channel de-multiplexer, for de-multiplexing downlink user data and downlink control channel;
    c) a control signaling interpreter, for determining whether the eNodeB transmits control signaling to the UE or not and then processes the control signaling; and
    d) a physical channel multiplexer, for multiplexing uplink user data together with a uplink control signaling to form a physical channel,
    wherein for a UE referred to as an A-type UE that simultaneously needs the uplink scheduling channel and the downlink scheduling channel, a mapping relationship is specified between locations of the downlink scheduling channel and the uplink scheduling channel.

11. A method for indicating an ACK/NACK channel for a random access message 3 comprising steps of:
    a) a UE transmitting a random access preamble;
    b) an eNodeB transmitting a random access message 2, to indicate a fundamental ACK/NACK channel transmitted over a downlink, by means of the fundamental ACK/NACK channel, obtaining message 3 ACK/NACK channels corresponding to the preambles implicitly according to orders that responding messages responded by the eNodeB is in the message 2;
    c) the UE transmitting the random access message 3 according to a mechanism of HARQ, and the eNodeB transmitting ACK or NACK information over the ACK/NACK channel indicated by the message 2;and
    d) eNodeB transmitting a random access message 4,
    wherein the eNodeB explicitly allocates different physical resources for message 3 ACK/NACK channels of each UE.

12. The method according to claim 11, wherein step b) further comprising step of explicitly indicating a fundamental ACK/NACK channel, and this indication information is transmitted through either a PDCCH allocated for message 2 or PDSCH allocated for message 2.

13. The method according to claim 11, wherein step b) further comprising step of implicitly obtaining an index of a fundamental ACK/NACK channel transmitted in the downlink according to an index of a CCE occupied by a downlink PDCCH allocated for message 2.

14. The method according to claim 11, wherein step b) further comprising step of allocating ACK/NACK channels in an ascend order or a descend order starting from a fundamental ACK/NACK channel according to an order of respective response messages of the preambles arranged in message 2.

* * * * *